US012772348B2

(12) United States Patent
Buehler et al.

(10) Patent No.: US 12,772,348 B2
(45) Date of Patent: Oct. 20, 2026

(54) SUSCEPTOR AND METHOD FOR THE MANUFACTURE THEREOF

(71) Applicant: PHILIP MORRIS PRODUCTS S.A., Neuchatel (CH)

(72) Inventors: Frederic Ulysse Buehler, Neuchatel (CH); Fabio Cantieri, Bologna (IT); Onur Dayioglu, Neuchatel (CH); Michele Lorenzelli, Bologna (IT); Cyrille Poindron, Cruseilles (FR); Enrico Pietrobuoni, Casalecchio di Reno (IT)

(73) Assignee: Philip Morris Products S.A., Neuchatel (CH)

( * ) Notice: Subject to any disclaimer, the term of this patent is extended or adjusted under 35 U.S.C. 154(b) by 831 days.

(21) Appl. No.: 18/022,623

(22) PCT Filed: Aug. 23, 2021

(86) PCT No.: PCT/EP2021/073233

§ 371 (c)(1),
(2) Date: Feb. 22, 2023

(87) PCT Pub. No.: WO2022/043244

PCT Pub. Date: Mar. 3, 2022

(65) Prior Publication Data

US 2023/0337337 A1 Oct. 19, 2023

(30) Foreign Application Priority Data

Aug. 28, 2020 (EP) .................................... 20193260

(51) Int. Cl.

| | |
|---|---|
| ***H05B 6/10*** | (2006.01) |
| ***A24F 40/20*** | (2020.01) |

(Continued)

(52) U.S. Cl.
CPC ............. *H05B 6/105* (2013.01); *A24F 40/20* (2020.01); *A24F 40/465* (2020.01); *A24F 40/70* (2020.01); *B21D 22/20* (2013.01)

(58) Field of Classification Search
CPC ........ A24F 40/20; A24F 40/465; A24F 40/70; A61K 31/337; A61K 31/5377;
(Continued)

(56) References Cited

U.S. PATENT DOCUMENTS

| | | |
|---|---|---|
| 11,856,993 B2 | 1/2024 | Mironov |
| 12,285,051 B2 | 4/2025 | Mironov |

(Continued)

FOREIGN PATENT DOCUMENTS

| | | |
|---|---|---|
| CN | 110621173 | 1/2020 |
| DE | 102018133156 | 6/2020 |

(Continued)

OTHER PUBLICATIONS

PCT International Search Report and Written Opinion for PCT/EP2021/073233 dated Nov. 19, 2021 (15 pages).

(Continued)

*Primary Examiner* — Quang T Van
(74) *Attorney, Agent, or Firm* — Mueting Raasch Group

(57) ABSTRACT

A method for manufacturing a susceptor for an inductively heatable aerosol-generating article includes the steps of providing a band of susceptor material and providing a compression stage. The compression stage includes oppositely arranged compression elements. In a first portion of the compression stage, the compression elements are arranged to define a progressively narrowing compression gap and in a second portion of the compression stage the compression elements are arranged to define a constant compression gap there between and the oppositely arranged compression elements are configured to have matching (Continued)

surface structures. The band of susceptor material is guided through the narrowing compression gap of the compression stage, such that the matching surface structures of the compression elements deep draw the band of susceptor material. A susceptor element having successively arranged plain and expanded portions and a method of manufacturing thereof are also provided.

15 Claims, 15 Drawing Sheets

(51) Int. Cl.

| | |
|---|---|
| ***A24F 40/46*** | (2020.01) |
| ***A24F 40/465*** | (2020.01) |
| ***A24F 40/70*** | (2020.01) |
| ***B21D 22/20*** | (2006.01) |

(58) Field of Classification Search

CPC .......... A61P 29/00; A61P 35/00; A61P 35/02; A61P 37/00; B21D 22/20; C07D 235/08; C07D 235/10; C07D 235/24; C07D 401/10; C07D 403/04; C07D 403/10; C07D 405/04; C07D 405/10; C07D 409/10; C07D 413/04; C07D 413/10; C07D 417/04; C07D 417/10; H05B 6/105; H05B 6/108

USPC ................ 219/634, 635, 618, 647, 649, 650

See application file for complete search history.

(56) References Cited

U.S. PATENT DOCUMENTS

| | | | | |
|---|---|---|---|---|
| 12,295,405 | B2 * | 5/2025 | Batista ..................... | A24D 1/20 |
| 2020/0236994 | A1 | 7/2020 | Blandino | |

FOREIGN PATENT DOCUMENTS

| | | |
|---|---|---|
| EP | 2797443 | 10/2019 |
| EP | 3250061 | 9/2020 |
| JP | 2018-530311 | 10/2018 |
| KR | 10-2015-0145263 | 12/2015 |
| KR | 10-2017-0008209 | 1/2017 |
| WO | WO 2020/125835 | 6/2020 |

OTHER PUBLICATIONS

International Preliminary Report on Patentability for PCT/EP2021/073233 dated Mar. 29, 2022 (15 pages).

Office Action issued in Korea for Application No. 10-2023-7004851 dated May 15, 2025 (5 pages). English translation included.

Office Action issued in Japan for Application No. 2024-109747 dated May 20, 2025 (3 pages).

Office Action issued in China for Application No. 202180056795.6 dated Nov. 1, 2025 (22 pages). English translation included.

* cited by examiner

SUSCEPTOR AND METHOD FOR THE MANUFACTURE THEREOF

This application is a U.S. National Stage Application of International Application No. PCT/EP2021/073233 filed Aug. 23, 2021, which was published in English on Mar. 3, 2022, as International Publication No. WO 2022/043244 A1. International Application No. PCT/EP2021/073233 claims priority to European Application No. 20193260.5 filed Aug. 28, 2020.

The present invention relates to a susceptor and to a method for manufacturing a susceptor for use in an inductively heatable aerosol-generating article.

Aerosol-generating articles including at least one aerosol-forming substrate that is capable to form an inhalable aerosol when heated are generally known. For heating the substrate, the article may be received within an aerosol-generating device which comprises an electrical heater. The heater may be an inductive heater comprising an induction source. The induction source is configured for generating an alternating electromagnetic field to inductively heat a susceptor by at least one of eddy currents and hysteresis losses, depending on the electrical and magnetic properties of the susceptor. The susceptor may be integral part of the article and arranged such as to be in thermal proximity or direct physical contact with the substrate to be heated. In operation of the device, volatile compounds are released from the heated aerosol-forming substrate in the article and entrained in an airflow that is drawn through the article during a user's puff. As the released compounds cool, they condense to form an aerosol.

The susceptor may comprise or may consist of a metal sheet. Although such sheet-like susceptors can be easily manufactured and provide extensive heat emission due to their two-dimensional nature, the total mass of such susceptors may be often still disproportional to the heat emission surface. Thus, resources are not efficiently used.

Reducing the mass of susceptors, in particular reducing the thickness of the sheet material used in manufacturing the susceptors, poses high demands to the involved manufacturing processes.

Therefore, it would be desirable to have a method for manufacturing a susceptor for an inductively heatable aerosol-generating article, which allows for high reliability and reproducibility even for very thin susceptor material.

In particular, it would be desirable to have a method for manufacturing a corrugated susceptor for an inductively heatable aerosol-generating article, wherein the susceptor is manufactured from very thin susceptor material.

It would further be desirable to have a method for manufacturing susceptors wherein the sensorial medium is deposited onto the susceptor during the shaping process.

It would further be desirable to have a method for manufacturing susceptors, which offers increased flexibility as to the resulting heating profile of the susceptors.

It would further be desirable to have a method that allows to deposit the sensorial medium in predetermined regions of the susceptor element.

The invention relates to a method for manufacturing a susceptor for an inductively heatable aerosol-generating article, wherein the method comprises the steps of providing a band of susceptor material, and providing a compression stage comprising oppositely arranged compression elements. The compression stage has a first portion, in which the compression elements are arranged to define a progressively narrowing compression gap in processing direction, and a second portion, in which the compression elements are arranged to define a constant compression gap there between in processing direction, and wherein the oppositely arranged compression elements are configured to have matching surface structures. The method further comprises the step of guiding the band of susceptor material through the narrowing compression gap of the compression stage, such that the matching surface structures of the compression elements deep draw the band of susceptor material.

The matching surfaces structures of the oppositely arranged compression elements may be configured such that the band of susceptor material is provided at least on one side with at least one depression. The surfaces of the compression elements may for example comprise protruding structures that cooperate with corresponding recessed structures of the respective oppositely arranged compression elements. When the band of susceptor material is guided through oppositely arranged compression elements of the compression stage, the surface structures deep draw the band of susceptor material and modify the surface of the susceptor material accordingly.

With the progressively narrowing compression gap in processing direction the susceptor material is gradually formed into the final shape. This reduces the risk of material damage during the deep drawing process. In this way even very thin bands of susceptor material may be processed in the compressing stage.

Advantageously the first portion of the compression stage, that is to say the portion forming the progressively narrowing compression gap in processing direction is located at the upstream end of the compression stage. The second portion of the compression stage is advantageously arranged downstream from the first portion of the compression stage. In this way the band of susceptor material is first guided through the first portion of the compression stage. In this portion the band of susceptor material is provided with depressions formed into the desired shape.

In the subsequent second portion of the compression stage the final shape of the susceptor material is confirmed. For this purpose the compression elements of the second portion of the compression stage form a constant compression gap in processing direction and exert a constant pressure onto the susceptor material.

The compression elements may be configured as belts that are each guided over a plurality of guide rollers. The belts may be oppositely arranged such that they form a compression gap through which the band of susceptor material is guided. In the first portion of the compression stage the guide rollers are further arranged such that the belts define a progressively narrowing compression gap in processing direction. In the second portion of the compression stage the guide rollers are arranged such that the belts define a constant compression gap in processing direction.

Each belt may be guided over a plurality of guide rollers. At least one of the guide rollers may be configured as a drive roller. A drive roller is a guide roller that is connected to a drive motor. A drive roller is used to actuate the corresponding belt.

The belts may be toothed belts with a plurality of teeth extending from the surface of the belt. The teeth may be regularly arranged with a constant pitch. The toothed belts may be arranged such that a tooth from one belt interpenetrates between two neighbouring teeth arranged on the opposite belt. Using two identical belts offers the advantage that only one belt design is used and that therefore the number of different parts of the device is reduced. In addition the risk that incorrect belts are used is avoided.

The belts may also be provided with alternatively matching female and male teeth. The female teeth are formed with a recess that is large enough to receive the male teeth therein. The male and female teeth may be alternately arranged on each belt. In this configuration both surfaces of the band of susceptor material are alternately provided with protrusions and depressions.

The male teeth may also be arranged exclusively on the one belt, while the female teeth may be arranged on the other belt. In this configuration only one surface of the band of susceptor material is provided with protrusions while the other surface is only provided with depressions.

Belts with matching female and male teeth may be advantageous in that the compression gap through which the band of susceptor material is guided is well defined. In this way an increased control of the resulting depressions and protrusions that are provided to the band of susceptor material is obtained.

The teeth of the belts may have a great variety of shapes, such that various surface patterns may be created on the surfaces of the band of susceptor material. The teeth may extend across the full width of the belts. The teeth may extend over only a part of the width of the belt. Consecutively arranged teeth may be offset from each other. The teeth may be configured to form transversal waves with respect to the direction of movement of the band of susceptor material. The teeth may be arranged to form longitudinal or transversal depressions with respect to the longitudinal direction of the band of susceptor material and may be distributed according to any desired pattern. The belts may also be provided with rows of parallel arranged teeth. The configuration of the teeth of the belts determines the resulting shape of the surfaces of the band of susceptor material. When the depressions of the belts are subsequently filled with sensorial medium, the evaporation characteristics of the sensorial medium may be controlled or at least influences by the surface design of the susceptor material.

The toothed belts may at the same time be used as timing belts during the deep drawing process of the band of susceptor material. Thus, the belts may help to have a strong pull on the band of susceptor material as well as help synchronizing movement of the belts. Since the surface structures of the belts engage with each other during compression, these surface structures at the same time prevent slipping or any other undesired relative movement between the belts.

In order to assist the deep drawing process, heat generation units may be employed. These heat generation units may be used to warm up the band of susceptor material before or during the re-shaping process in the compression stage.

The compression elements may be configured as screw shaped elements. The compression stage may comprise one or more pairs of consecutively arranged screw shaped elements. In the first portion of the compression stage the screw shaped elements may be configured and arranged such that the threadings provided at the outer circumference of the screw shaped elements form a progressively narrowing compression gap in processing direction. In the second portion of the compression stage the screw shaped elements may be configured and arranged such that the screw shaped elements form a constant compression gap in processing direction.

When the band of susceptor material is guided through the compression gap formed by the oppositely arranged screw shaped elements, the band of susceptor material is both dragged and progressively drawn into the desired corrugated shape. Thus, no additional drive means for the band of susceptor material is required in the compression stage. In addition, the compression stage has a rather simple construction, since it essentially consists of screw shaped elements, only.

The screw shaped elements are essentially cylindrical elements. The outer circumference of oppositely arranged screw shaped elements is provided with corresponding threadings having a corresponding threading pitch. The axis of rotation of the screw shaped elements may be oriented essentially parallel to the processing direction of the band of susceptor material.

In order to form a progressively narrowing gap in processing direction the screw shaped elements may be arranged such that their longitudinal axes are slightly inclined towards each other such that the threadings provided at the outer circumference of the screw shaped elements form a progressively narrowing compression gap in processing direction. Such embodiment may be advantageous since the screw shaped elements used therein are identical and have a regular cylindrical shape.

The screw shaped elements may also be configured to have a progressively increasing diameter. In such embodiment the screw shaped elements may be arranged such that their longitudinal axes are oriented in parallel to each other. In this configuration the threadings provided at the outer circumference of the screw shaped elements again form a progressively narrowing compression gap in processing direction. The parallel configuration of the longitudinal axes of the screw shaped elements may offer advantages in constructional respect. This may in particular be true in case a plurality of consecutively arranged pairs of screw shaped compression elements is used. It may be advantageous, if all this compression elements have a common axis of rotation.

In the first portion of the compression stage that is in the portion in which the screw shaped elements form a progressively narrowing compression gap in processing direction, the initially flat band of susceptor material is progressively drawn into a corrugated shape. Again due to the progressively narrowing compression gap in processing direction, the forming process is slow and smooth such that the risk of material failure is reduced.

In the second portion of the compression stage the screw shaped elements form a compression gap that has a constant size in processing direction. The second portion again helps to maintain the band of susceptor material into the correct final corrugated or wavy shape.

A compression stage comprising screw shaped compression elements may further comprise one or more guiding elements. The guiding elements may be screw shaped guiding elements. The screw shaped guiding elements may be arranged on top or below a pair of screw shaped compression elements. The screw shaped guiding elements may be arranged in engagement with a pair of screw shaped compression elements. The guiding elements may have a thread pitch that corresponds to the thread pitch of the compression elements. In this way the guiding elements may rotatingly engage with the compression elements. The guiding elements and the compression elements may share the same driving element, and may be arranged to laterally define the compression gap there between.

The guiding elements assist in guiding the band of susceptor material. The guiding elements may prevent that due to the rotation of compression elements the band of susceptor material is drifting out of the compression gap. It is therefore particularly advantageous, if the guiding elements are configured and arranged to laterally confine the compression gap. Advantageously two guiding elements are provided per each pair of screw shaped compression elements.

The compression stage may comprise a third portion in which compression elements are arranged to define a progressively expanding gap in processing direction. The compression elements used in the third portion of the compression stage may generally be formed like the compression elements in the first and second portion of the compression stage.

Thus, if the compression elements in the first portion of the compression stage are provided in the form of opposing belts that are guided over guide rollers, the compression elements of the third stage may equally be belts that are guided over guide rollers. In the third portion of the compression stage the guide rollers are arranged such that the belts define a progressively expanding gap in processing direction.

If the compression elements in the first portion of the compression stage are provided in the form of opposing screw shaped compression elements, the compression elements of the third stage may equally be provided in the form of screw shaped compression elements. In the third portion of the compression stage the screw shaped compression elements are arranged such that they define a progressively expanding gap in processing direction.

For forming the progressively expanding gap in processing direction the same considerations apply as discussed above with respect to the configuration of the screw shaped elements used in the first portion of the compression stage and which define the progressively narrowing compression gap in processing direction. Thus, the screw shaped elements may also be configured to have a progressively decreasing diameter or the screw shaped elements may be arranged such that their longitudinal axes are slightly inclined away from each other.

By providing a compression stage having a third compression stage in which the compression elements are configured to define a progressively expanding gap in processing direction, the compression elements are slowly solved from engagement with the freshly shaped band of susceptor material. With this progressive withdrawal of the compression elements, the risk of potential damage to the shaped band of susceptor material is reduced.

The third portion of the compression stage defining the progressively expanding gap in processing direction is advantageously located at the downstream end of the compression stage.

The method may further comprise a sensorial medium injection step in which a sensorial medium may be injected onto the band of susceptor material. The sensorial medium may be injected into a depression of the band of susceptor material.

The sensorial medium may be injected onto the band of susceptor material by a separate injection device.

The injection device may also be included in the compression stage. Advantageously the injection device is included in the third portion of the compression stage.

In embodiments in which the compression elements are provided in the form of opposing toothed belts that are guided over guide rollers, one or more of the teeth or protruding structure of the belts may be provided with a central hollow channel extending completely through the belt and the protruding tooth element.

One or both of the toothed belts may be guided along a pressurized sensorial medium storage. The sensorial medium storage may have an opening that faces the back side of a toothed belt. The back side of the toothed belt may generally cover the opening of the pressurized sensorial medium storage such that the pressurized sensorial medium is prevented from spilling out of the sensorial medium storage. A toothed belt may be guided along the sensorial medium storage in such way that the central hollow channels of the teeth are brought into fluid communication with the opening of the pressurized sensorial medium storage.

When a central hollow channel is in fluid communication with the opening of the pressurized sensorial medium storage, an amount of the sensorial medium is flowing through the central hollow channel and is delivered from the tip of the tooth into a depression in the band of susceptor material.

The amount of sensorial medium delivered in each injection step may be adjusted as required. The delivered amount may for example be adjusted by modifying the pressure in the pressurized sensorial medium storage, by modifying the speed of the belts or by modifying the size of the channels in the teeth.

The injection device may be a fixed with respect to the compression stage. The injection device may be provided in the third portion of the compression stage. In the third portion of the compression stage the teeth of the belts are progressively withdrawn from the corrugations provided to the band of susceptor material. The third portion of the compression stage is optimally suited for injecting the sensorial medium, since the progressive withdrawal of the teeth allows space for the sensorial medium to be inserted into the depressions of the band of susceptor material.

Pressurization of the sensorial medium storage may be obtained by any suitable means, like a piston or a pump. The pump may be a peristaltic pump or another kind of pump useful to cooperate with the sensorial medium.

If the compression elements in the first portion of the compression stage are provided in the form of opposing screw shaped compression elements, injection of the sensorial medium may be achieved via one or more hollow radial channels that open at the ridges of the threading provided at the outer circumference of one or both of the screw shaped compression elements. The one or more hollow, radially arranged channels may be connected to a stationary, pressurized sensorial medium storage.

In particular if more than one radial channels are provided, the respective screw shaped compression element may be provided with a central axial channel that acts as a manifold for the plurality of radial channels. The central axial channel may be configured to be connected to the sensorial medium storage. The central axial channel may be configured to be connected via a tube or any other conduit to the sensorial medium storage.

Also in this embodiment the radial channels are advantageously provided in the screw shaped compression elements of the third portion of the compression stage. As discussed before, in the third portion of the compression stage the ridges of the screw shaped compression elements are progressively withdrawn from the corrugations provided to the band of susceptor material. This again leaves sufficient space for the sensorial medium in the corrugations of the band of susceptor material and is therefore an ideally suited moment to for injecting the sensorial medium.

The quantity of sensorial medium injected can be determined by the pressure of sensorial medium in the sensorial medium storage, by the diameter of the axial hollow channel as well as by the size and the number of the hollow radially arranged channels in the screw shaped compression elements.

The invention also relates to a method for manufacturing a susceptor for an inductively heatable aerosol-generating article, wherein the method comprises the steps of providing a band of susceptor material, and providing a cutting stage comprising a periodically corrugated blade. With the periodically corrugated blade at least parts of the band of the band of susceptor material is cut and expanded, such that the band of susceptor material is provided with successive regions of plain and expanded susceptor material.

The periodically corrugated blade is configured to have a cutting blade with a corrugated periodic profile. The exact shape of the corrugated profile may be adapted to the desired characteristic of the expanded portion that is formed from the cut portions. However, the corrugations need to be formed such that the band of susceptor material is not fully cut over the full width of the band of susceptor material. Instead, the band of susceptor material is only to be provided with partial cut lines between which uncut bridges of susceptor material remain.

The corrugated profile may have a triangular or other polygonal shape or may have rounded shape such as a sinusoidal shape.

As discussed above, the blade with the corrugated shape is configured to partially cut the band of susceptor material along the width thereof. The blade is at the same time also provided with a shaping portion which follows the design of the cutting blade and which stamps the cut portion into a corrugated shape. Thus, the cut portion of the initially flat band of susceptor material is cut and expanded into a corrugated shape at the same time.

The cutting and expansion process is preferably a stepwise process. This means that in between individual cutting and expansion steps, the band of susceptor material is fed forward by a predetermined amount. In addition the periodically corrugated blade may be laterally off-set between successive cutting and expansion steps.

During the cutting and expansion process the initially flat band of susceptor material is stepwise fed into the cutting stage and the cutting blade is reciprocated perpendicular to the feed direction. In this way the initially flat band is provided with alternatingly offset cuts that are used to form corresponding expanded portions.

In this way the complete band of susceptor material can be transformed into an expanded band of susceptor material. It is also possible to create a band with successive portions of expanded and plain susceptor material.

By the expansion process the cut portion of the band of susceptor material is expanded in cutting direction, which essentially extends perpendicular to the flat uncut portions of the band. The resulting band therefore is provided with a stair-like profile in the length direction.

After cutting and expanding the processed band may be flattened in order to prepare the susceptor material for further treatment. For this purpose the band of susceptor material may be flattened by folding or stamping. In this way a flat band with susceptor material with successively arranged plain and expanded regions may be obtained.

A band of susceptor material having successively arranged plain and expanded portions offers new possibilities regarding the induction heating process. The plain portions comprise more surface and volume for the Eddy currents than the expanded portions. Accordingly more heat is generated in the plain portions of the band of susceptor material areas than in the expanded areas. This may be used to design a heating profile of the susceptor element. This may also be used in the decisions as to where a sensorial media should be placed with respect to the susceptor element.

The method may further include the step of providing a sensorial medium to the band of susceptor material. The step of providing a sensorial medium to the band of susceptor material may be performed simultaneously with a cutting and expansion step. The step of providing a sensorial medium to the band of susceptor material may be carried out such that the expanded regions are provided with sensorial medium during the cutting and expansion step.

For this purpose the cutting stage may be provided with a sensorial medium storage. The sensorial medium storage may have a release opening that is adjacent to the region where the expansion step is carried out. The release sensorial medium storage may have a release opening that is located such that the band of susceptor material that is getting expanded by the cutting blade is moved across the release opening. The sensorial medium storage is configured such that sensorial media is released during expansion of the susceptor material. In this way the sensorial medium may be directly taken up by the expanded portions during their manufacture. In particular, sensorial medium may be fed in the pierced or open portions of the susceptor in expanded regions, so that the addition of sensorial medium is not generating any change of thickness.

The sensorial medium storage may comprise pressurized medium and may have a controllable valve that can be opened to release sensorial medium. The sensorial medium storage may also comprise a controllable piston that may modify the volume of the sensorial medium storage and that may press the sensorial medium out of the release opening.

Both the valve and the piston may be synchronized with the movement of the cutting blade, such that the medium is released during the expansion step. The expanded portions are well suited to be provided with the sensorial medium since due to the open structure of the expanded portions the vaporized sensorial medium can be readily taken up by an air flow past the susceptor material.

As used herein, the term "expanded susceptor material" refers to a type of susceptor material in which a plurality of weakened areas, in particular a plurality of perforations have been created and which subsequently has been stretched to form a regular pattern of openings originating from stretching the plurality of weakened areas, in particular from the plurality of perforations. The susceptor material may be expanded by piercing.

Using a susceptor comprising an expanded susceptor material provides a plurality of advantages as compared to other types of sheet-like susceptors.

First, due to the specific manufacturing process the mass per unit area of the expanded susceptor material is decreased as compared to a susceptor material without such openings. At the same time, the surface of the expanded susceptor material is still sufficiently large to provide extensive heat emission. As a result, the proportional rate between the total mass and the heat emission surface of a susceptor comprising an expanded susceptor material is improved as compared to a susceptor comprising a susceptor material without any openings. Advantageously, this helps to conserve resources for the manufacturing of the article. In addition, the reduced mass per unit area may also be beneficial with regard to a reduced total mass of the article.

Second, in comparison to a susceptor material comprising openings which have been created by material removal, for example by punching, the manufacturing of an expanded susceptor material comprising openings which have been created as described above, that is, by weakening, in particular perforating and stretching a susceptor material, advantageously does not involve a waste of material. Also for this reason, the susceptor of the article according to the present invention advantageously allows to save materials and production costs, and thus to conserve resources.

Third, due to the openings, the susceptor of the article according to the present invention is permeable causing the airflow drawn through the article to be enhanced as compared to an article comprising a non-permeable susceptor. In addition, the openings of the susceptor facilitate the release and entrainment of the material that is volatilized from the heated aerosol-forming substrate into the airflow. Advantageously, both aspects facilitate aerosol formation.

Fourth, a susceptor comprising an expanded susceptor material is more robust as compared to an equivalent weight of a welded or woven susceptor mesh, because the susceptor material-though being weakened, in particular perforated, and stretched—stays in one piece and thus retains its strength. At the same time, an expanded susceptor material is more flexible and less stiff than a susceptor material without any openings. Advantageously, this facilities the material supply during the manufacturing of the aerosol-generating article.

Fifth, the openings of the expanded susceptor material may get filled with aerosol-forming substrate during the manufacturing of the article. Advantageously, this may support fixation of the susceptor within the aerosol-forming substrate. As a consequence, the positional accuracy and stability of the susceptor within the aerosol-forming substrate is significantly improved while the overall thickness is not affected. The sensorial material is not protruding from the susceptor, so that handling is facilitated.

The method may further comprise the step of forming the flattened band of susceptor material into a corrugated band of susceptor material as described above. Preferably the band of susceptor material is formed with periodically alternating plain and expanded portions. Further preferably the periodicity of these portions corresponds to the periodicity of the corrugations that are provided to the band of susceptor material. By adapting the two periodicities to each other, a corrugated band of susceptor material is obtained wherein the expanded and plain portions are always provided at the same positions.

The plain portions may be formed into depressions, herein also referred to as troughs, and the expanded portions may be formed into protrusions, herein also referred to as crests, of the resulting corrugated band of susceptor material. Alternatively, the plain portions may be formed into crests and the expanded portions may be formed into the troughs of the resulting corrugated band of susceptor material.

The method may further comprise the step of providing two bands of susceptor material. The method may further comprise the step of superimposing the two bands of susceptor material such that the expanded portions of the one band of susceptor material are located adjacent a plain portion of the other band of susceptor material. By superimposing the two bands of susceptor material in this way an expanded portion of the one band of susceptor material is located adjacent a plain portion of the other band of susceptor material. This configuration enhances the heat transfer from the plain portions to the expanded portions, which in turn enhances the vaporization capabilities of the susceptor arrangement.

The invention also relates to a susceptor for an inductively heatable aerosol-generating article, wherein the susceptor is provided as a band of susceptor material comprising successively arranged portions of plain and expanded susceptor material.

A band of susceptor material having successively arranged plain and expanded portions offers new possibilities regarding the induction heating process. The plain portions comprise more surface and volume for the Eddy currents than the expanded portions. Accordingly more heat is generated in the plain portions of the band of susceptor material areas than in the expanded areas. This may be used to design a heating profile of the susceptor element. This may also be used in the decisions as to where a sensorial media should be placed with respect to the susceptor element.

The portion of expanded susceptor material may be filled with sensorial medium. The sensorial medium may be located in the holes, porosities, openings of the expanded region and the sensorial media may not protrude from the susceptor thickness. A susceptor having successively arranged plain and expanded portions offers good heatability and has at the same time good vaporizing properties. The plain portions are used to produce heat which is easily transferred by conduction to the expanded portions. The expanded portions receive the heat from the neighboring plain portions such that the sensorial medium provided to the expanded portions may be vaporized. Due to the porous structure of the expanded portions the vaporized sensorial medium may engage with an airstream going past wither side of the susceptor material, such that the overall aerosolization of the sensorial medium is enhanced.

The flat band of susceptor material having successively arranged plain and expanded portions may be processed to be provided with corrugations. The flat band of susceptor material having successively arranged plain and expanded portions may be processed to be provided with troughs and crests. The flat band of susceptor material having successively arranged plain and expanded portions may be processed to be provided with troughs and crests such that the plain portions are formed into troughs and that the expanded portions are formed into the crests of the resulting corrugated band of susceptor material.

The crests of the susceptor material are extending into the air flow and are therefore well suited locations for vaporization to take place. Thus, this configuration is particularly advantageous when the expanded portions of the band of susceptor material are provided with sensorial medium.

Alternatively or in addition, the troughs of the susceptor material that are formed in the portions of plain susceptor material may also be provided with sensorial medium. Since the plain susceptor material generates more heat upon inductive heating, it may be desirous for specific sensorial media to be provided at these plain portions of the band of susceptor material.

As an example, the expanded susceptor can be made from a sheet having a thickness ranging between about 0.03 millimeter and about 1 millimeter, more preferably between about 0.05 millimeter and about 0.5 millimeter, for example between about 0.07 millimeter and about 0.2 millimeter. The openings in the expanded region can present a general diamond or rhombus shape, with a first diagonal ranging from 0.5 millimeter to 5 millimeter and a second diagonal ranging from 0.3 to 3 millimeter. The open area might range from 30 percent to 70 percent of the total area. The susceptor material may have the form of a band. Preferably, the band has a basic rectangular shape having a width preferably between about 2 millimeter and about 8 millimeter, more preferably, between about 3 millimeter and about 5 millimeter, for example 4 millimeter.

The invention further relates to a susceptor arrangement for an inductively heatable aerosol-generating article, wherein the susceptor arrangement comprises two bands of susceptor material as described herein. The two bands of susceptor material are superimposed such that the expanded crest regions of the one band of susceptor material are located adjacent the plain trough regions of the other band of susceptor material.

Such susceptor arrangement offers additional advantages. Since in this configuration always an expanded portion of the one band of susceptor material is located adjacent a plain portion of the other band of susceptor material, the inductive heat generated in the plain portion can be directly delivered to the expanded portion of the other band of susceptor material. Since the path for thermal conduction between the adjacent susceptors is shorter and the surface for thermal conduction between the adjacent susceptors is larger, heat can be more efficiently conducted in this configuration.

Moreover the crests on either side of the susceptor arrangement are formed from the expanded portions, such that optimum vaporization conditions on either side of the susceptor arrangement are obtained. Further, the troughs are formed from the plain portions of the susceptors and are located directly adjacent the crests of the other susceptor. Thus, the heat generated in either trough can be readily conducted to the adjacent susceptor, which enhances the overall vaporization performance of the susceptor arrangement.

The susceptor arrangement may be provided with sinusoidal or triangular corrugations. Advantageously, the periodicity of the corrugation corresponds to the periodicity of the successive plain and expanded portions. As an example, the corrugations might present a crest to crest height of about 5 to 15 times the thickness of the flat band before forming.

As discussed before, the crests of the susceptor arrangement extend into the air flow generated in the aerosol-generating article, such that from this point of view it is advantageous to have the crests formed from the expanded portions of susceptor material that is carrying the sensorial medium.

However, the sensorial medium may in that case also be more prone to be negatively affected by additional manufacturing steps carried out during the further manufacture of the aerosol-forming articles. Thus, it may also be advantageous to form the crests from the unloaded plain material and to form the troughs from the loaded expanded material. In order to allow a more intense user experience additional sensorial medium may be loaded onto the expanded portions.

By providing triangular corrugations, the susceptors may be arranged such that the diffusion direction of the vaporized sensorial medium may be orientated. For example, the susceptors may be arranged such that the diffusion direction of the vaporized sensorial medium is directed in air flow direction through the aerosol-generating article and towards the mouth end of the article.

The invention relates also to a method for providing sensorial medium to a band of susceptor material, wherein the band of susceptor material is manufactured as described herein. The band of susceptor material may be a corrugated band of susceptor material or may be a flat band of susceptor material comprising successively arranged portions of plain and expanded susceptor material.

The sensorial medium may be provided to the band of susceptor material by dipping. For this purpose, the band of susceptor material may be guided through a tank comprising sensorial medium. The band of susceptor material may be fully dipped into the sensorial medium such that the complete surface of the band of susceptor material comes into contact with the sensorial medium.

In order to carry the band of susceptor material through the tank of sensorial medium, a pair of guide rollers may be provided, between which the band of susceptor material is clamped and transported through the sensorial medium tank. A pair of such guide rollers may be provided at either end of the sensorial medium tank. In this way the movement of the band of susceptor material through the tank of sensorial medium may be well controlled.

This method may be particularly suitable to deposit sensorial medium onto a band of susceptor material comprising successively arranged of plain and expanded portions. The sensorial medium may better stick to the expanded portions than to the plain portions. Accordingly, this method may be particularly suited for depositing sensorial medium onto expanded portions of a band of susceptor material.

The sensorial medium may be provided to the band of susceptor material via a coating roller. The surface of the coating roller may be provided with sensorial medium. By guiding the band of susceptor material over the coating roller the sensorial medium may be deposited onto the band of susceptor material.

The band of susceptor material may be slightly pressed against the coating roller such that a sufficient contact between the band of susceptor material and the coating roller is maintained. If the band of susceptor material is a corrugated band, the band may be guided through a roller gap formed between the coating roller and a counter roller. The distance of this roller gap may be smaller than the peak-to-peak distance of the corrugations. In this way the counter roller may help to press the band of susceptor material against the coating roller. The counter roller not only helps to maintain a sufficient contact pressure, but also enlarges the contact surface between the corrugated band of susceptor material and the coating roller, such that a larger area of the band of susceptor material is provided with sensorial medium. This method may be particular suited for corrugated bands of susceptor material having sinusoidally shaped corrugations which have a high elasticity.

If the band of susceptor material is a corrugated band, the coating roller contacts only the crests of the band of susceptor material. Accordingly, only the crests of the corrugated band are provided with sensorial medium. The corrugated band of susceptor material may be formed such that the crests are formed from the expanded portions of susceptor material. The expanded portions can better hold the sensorial medium than the plain portions, such that in this configuration deposition of the sensorial medium is more efficient.

The band of susceptor material may also be pressed against the coating roller by two tension rollers that are provided downstream and upstream of the coating roller. The tension rollers may be used to modify the tension of the band of susceptor material in the vicinity of the coating roller. By modifying the band tension, the coating efficiency may be adjusted. Use of tension rollers may be particularly useful, if the band of susceptor material is a flat band.

The tension rollers may also be used to modify the arc of contact between the band of susceptor material and the coating roller. In this way the contact time between the band of susceptor material and the coating roller may be modified. Adjustment of the arc of contact may be used to increase coating efficiency.

The coating roller may be in fluid communication with a sensorial medium storage. The coating roller may be located above a sensorial medium storage at such distance that the lower portion of the coating roller dips into the sensorial medium provided in the sensorial medium storage. The sensorial medium may wet the surface of the coating roller and may be subsequently deposited on the band of susceptor material.

The coating roller may be in direct fluid communication with a sensorial medium storage. The coating roller may also be in indirect fluid communication with a sensorial medium storage. Indirect fluid contact may be established via an intermediate roller, which is in direct contact with the sensorial medium and which transfers the sensorial medium to the coating roller. One or more intermediate rollers may be provided between the sensorial medium storage and the coating roller. By using one or more intermediate rollers the amount of sensorial medium that is provided to the coating roller and subsequently to the band of susceptor material may be controlled more precisely.

The sensorial medium may be provided to the band of susceptor material by guiding the band of susceptor material below a sensorial medium storage. The sensorial medium storage may have an opening at its bottom, which opening may be in contact with the upper surface of the band of susceptor material.

The band of susceptor material may be conveyed on an endless moving belt. The opening of the sensorial medium storage may be located directly in contact with the upper surface of the band of susceptor material.

Such configuration may be advantageous for use with a band of susceptor material being a flat band comprising successively arranged plain and expanded portions. When a plain portion of the band of susceptor material is directly beneath the opening, the plain portion effectively seals the opening and prevents outflow of sensorial medium onto the band of susceptor material.

When an expanded portion of the band of susceptor material is directly beneath the opening, sensorial medium is delivered onto the expanded portions opening up to their full capacity. In this way only a limited quantity of sensorial medium is delivered to the band of susceptor material.

An injection device in which a sensorial medium storage is used that is provided above a band of susceptor material may also be used with a corrugated band of susceptor material. The opening at the bottom of the sensorial medium storage may not necessarily be in contact with the band of susceptor material. The sensorial medium storage may nevertheless be used to deliver sensorial medium to the concave trough portions of the band of susceptor material that is transported below the opening of the sensorial medium storage.

This injection device may be used for the deposition of sensorial medium a corrugated band of susceptor material in which the troughs are formed from plain portions of susceptor material, and wherein optionally the crests are formed from expanded susceptor material.

Being made from plain susceptor material the troughs may hold a significant amount of sensorial medium. Moreover, the quantity of sensorial medium delivered to each trough of the corrugated band of susceptor material may be kept constant. An identical amount of sensorial medium may be filled into each of the troughs. If the crests are formed from expanded susceptor material, these crests may define a maximum fill level for the sensorial medium. The crests may act as spill-over to limit the amount of sensorial medium delivered to the troughs. Thus, when the fill level in the troughs reaches the portions of the porous expanded material areas, any exceeding amount of sensorial medium may spill out through the porous expanded material.

The opening of the sensorial medium storage may be opened and closed via suitable means known to the skilled person. For example an opening valve may be provided that may be controlled in dependence of the periodicity of the band of susceptor material to be loaded with sensorial medium. In this way the sensorial medium may be delivered exactly when a trough is located below the opening.

In order to regulate the flow of the sensorial medium or the pressure in the sensorial medium storage a pump such as a peristaltic pump may be provided. The pump may be synchronized with the valve. In this way it may be ensured that a sufficient amount of sensorial medium is delivered to each of the troughs of the corrugated band of susceptor material.

The sensorial medium may be provided to a corrugated band of susceptor material via an injection device that utilizes sensorial medium in solid state. The method may comprise advancing solid state sensorial medium towards a puncher, cutting off an amount of sensorial medium and delivering this amount of sensorial medium to a trough of the corrugated band of susceptor material.

Sensorial medium in solid state may be easier to handle than liquid sensorial medium. Delivering the sensorial medium in solid state allows consistent and precise dosing of the sensorial medium. Thus, with this method corrugated bands of susceptor material may be manufactured in which all troughs are provided with an identical and predetermined amount of sensorial medium.

The method may further comprise a step of temporarily liquefying the amount of sensorial medium that is delivered to the troughs of the corrugated band of susceptor material.

Liquefying the amount of sensorial medium may be facilitated by temporarily heating up the sensorial medium after delivering the sensorial medium to the troughs of the corrugated band of susceptor material. Heating up may be carried out by any suitable heating device. A suitable heating device is a hot air gun. Hot air delivered from such hot air gun may be sufficient to decrease viscosity of the sensorial medium. The heated sensorial medium may then start to become fluid and to adhere to the walls of the troughs of the band of susceptor material.

Upon heating the sensorial medium, it may be advantageous if only the sensorial medium is heated, while heating up of the susceptor material is largely avoided. In this case the amount of heat required for liquefying the sensorial medium may be minimized and deformation of the susceptor material due to excess heat is avoided. Moreover, the cooling process of the sensorial medium is accelerated if the susceptor material is heated up as little as possible.

In order to further speed-up the cooling process of the sensorial medium, the band of susceptor material may be conveyed through a cooling station. Cooling stations suitable for this process are known in the art. By accelerating the cooling process a fast re-jellification of the sensorial medium may be achieved. The band of susceptor material may only be continued to be processed after the sensorial medium has cooled down and sufficiently adheres to the susceptor material. Therefore, accelerating the cooling process may reduce the required time of overall manufacturing process.

The corrugated band of susceptor material may be conveyed stepwise past the injection device. Each step may correspond to the pitch width of the corrugated band of susceptor material. After each step the injection device is activated. A predetermined amount of the sensorial medium is cut off and is delivered to a trough of the corrugated band of susceptor material.

Stepwise movement of the corrugated band of susceptor material may be established via any suitable conveyor device. The conveyor device may comprise a toothed, endless belt that is driven by a stepper motor. The toothed belt may have a periodicity that corresponds to the periodicity of the corrugated band of susceptor material. In this way each tooth of the toothed belt may engage with a trough of the corrugated band of susceptor material. By dividing the traction force over a plurality of engagement points, stress on each individual engagement point may be reduced and deformation of the corrugated band of susceptor material may be avoided.

Advancing the sensorial medium towards cutting device and cutting off a predetermined amount of sensorial medium may be carried out using suitable processes and devices known in the art. An advancement mechanism may comprise a piston or a clamp which engages with the solid state sensorial medium and which serves for moving the solid state sensorial medium.

For cutting off the predetermined amount of sensorial medium a puncher may be used. The puncher may be movable perpendicular to the advancement direction of the sensorial medium and may comprise a cutting blade at its front end. The puncher may be used to cut off the predetermined amount of sensorial medium and to push the cut off sensorial medium into a trough of the corrugated band of susceptor material located underneath the puncher.

The method may be used to fill the troughs on one side of the corrugated band of susceptor material, only. The method may be also be used to fill the troughs on either side of the corrugated band of susceptor material with sensorial medium. This may be performed via a two-step process. In a first step the troughs on first side of the corrugated band of susceptor material may be filled with sensorial medium. After the sensorial medium has been cooled sufficiently such that the sensorial medium sufficiently adheres to the troughs of the corrugated band susceptor material, the band may be turned around to fill the troughs on the second side of the corrugated band of susceptor material with sensorial medium.

Because the sensorial medium inside the trough may stick to the walls of the corrugated band, the sensorial medium should stay in position even when turned upside down. If the adherence of the sensorial medium is too weak, for example due to the vibrations of the movements of the moving corrugated band or due to the thixotropic property of the sensorial medium, the viscosity or the adherence of the sensorial medium may be increased. This can be done by further cooling down the metal band or by varying the composition of the sensorial medium.

The sensorial medium may be provided to a corrugated band of susceptor material via another injection device that utilizes liquid sensorial medium. The liquid sensorial medium may be provided in a sensorial medium storage through which the corrugated band of susceptor material is guided. The sensorial medium storage may have at least one inlet opening for introducing an unloaded corrugated band of susceptor material into the sensorial medium storage. The sensorial medium storage may have at least one outlet opening for allowing the loaded corrugated band of susceptor material to exit from the sensorial medium storage.

The outlet opening may be formed from two lips defining a distance there between. The distance between the lips may correspond to the peak-to-peak distance of the corrugated band of susceptor material.

The corrugated band is guided through the interior volume of the sensorial medium storage and is guided to exit the sensorial medium storage through the outlet opening.

The two lips defining the outlet opening may be elastic or pre-biased, or elastic and pre-biased such that each of the lips is slightly pressed against the corrugated band of susceptor material.

Upon guiding the corrugated band of susceptor material through interior and the outlet opening of the liquid medium storage, liquid sensorial medium is received in each trough of the corrugated band of susceptor material. The sensorial medium is configured to have a composition such that the sensorial medium received in each trough essentially adheres to the wall of the troughs of the corrugated band after the corrugated band has left the sensorial medium storage through the outlet opening.

Since the lips press from each side against the corrugated band, the lips effectively close the outlet opening such that no excess sensorial medium may exit the sensorial medium storage. In order to obtain reliable sealing the lips may have a length such that at every moment each of the lips contacts at least two crests of the respective side of the corrugated band of susceptor material.

The width of the lips may correspond to the width of the corrugated band. The outlet opening of the sensorial medium storage may be provided with a suitable sealing element to seal the outlet opening at the lateral sides of the corrugated band.

The lips are preferably made from elastic material. In this way height differences between subsequent crests of the corrugated band may be compensated. Alternatively or in addition the lips may be pre-biased towards each other via a suitable biasing device. In a simple construction such biasing may be obtained by a spring mechanism that is provided between each of the lips and the corresponding side surface of the sensorial medium storage.

Since the corrugated band of susceptor material may be subject to varying pulling and pushing forces during its movement through the sensorial medium storage, the peak-to-peak distance of the corrugated band may vary during the coating process. Such varying pulling and pushing forces may be caused by the viscosity of the sensorial medium or the friction of the corrugated band with the surface of the two lips at the outlet opening. By configuring the two lips elastic or by pre-biasing the lips, the distance between the two lips may be varied dynamically and may compensate for any changes of the dimensions of the corrugated band. In this way leak tightness at the outlet opening may be obtained and undesired outflow of excess sensorial medium may be prevented.

The expression ‘sensorial medium’ as used herein is understood to be a material or mixture of materials capable of releasing volatile compounds into an air stream passing through an article the susceptor is arranged in, preferably when the sensorial medium is heated.

The sensorial medium may be a gel. The provision of a gel may be advantageous for storage and transport, or during use, as the risk of leakage from the susceptor, aerosol generating article or aerosol generating device, may be reduced.

Advantageously the gel is solid at room temperature. 'Solid' in this context means that the gel has a stable size and shape and does not flow. Room temperature in this context means 25 degrees Celsius.

The sensorial medium may comprise an aerosol-former. Ideally the aerosol-former is substantially resistant to thermal degradation at the operating temperature of the susceptor. Suitable aerosol-formers are well known in the art and include, but are not limited to: polyhydric alcohols, such as triethylene glycol, 1, 3-butanediol and glycerine; esters of polyhydric alcohols, such as glycerol mono-, di- or triacetate; and aliphatic esters of mono-, di- or polycarboxylic acids, such as dimethyl dodecanedioate and dimethyl tetradecanedioate. Polyhydric alcohols or mixtures thereof, may be one or more of triethylene glycol, 1, 3-butanediol and, glycerine or polyethylene glycol.

Advantageously, the sensorial medium gel, for example, comprises a thermoreversible gel. This means that the gel will become fluid when heated to a melting temperature and will set into a gel again at a gelation temperature. The gelation temperature may be at or above room temperature and atmospheric pressure. Atmospheric pressure means a pressure of 1 atmosphere. The melting temperature may be higher than the gelation temperature. The melting temperature of the gel may be above 50 degrees Celsius, or 60 degrees Celsius or 70 degrees Celsius and may be above 80 degrees Celsius. The melting temperature in this context means the temperature at which the gel is no longer solid and begins to flow.

Alternatively, in specific embodiments, the gel is a non-melting gel that does not melt during use of the susceptor. In these embodiments, the gel may release the active agent at least partially at a temperature that is at or above the operation temperature of the susceptor in use, but below the melting temperature of the gel.

Preferably, the gel has a viscosity of 50,000 to 10 Pascal per second, preferably 10,000 to 1,000 Pascal per second to give the desired viscosity.

The gel may comprise a gelling agent. The gel may comprise agar or agarose or sodium alginate or Gellan gum, or a mixture thereof.

The gel may comprise water, for example, the gel is a hydrogel. Alternatively, in specific embodiments the gel is non-aqueous.

Preferably the gel comprises an active agent. The active agent may comprise nicotine (for example, in a powdered form or in a liquid form) or a tobacco product or another target compound for, for example, release in an aerosol. The nicotine may be included in the gel with an aerosol-former. Locking the nicotine into a gel at room temperature is desirable to prevent leakage of the nicotine from an aerosol-generating article.

The gel may comprise a solid tobacco material that releases flavour compounds when heated. The solid tobacco material may be one or more of: powder, granules, pellets, shreds, spaghettis, strips or sheets containing one or more of: plant material, such as herb leaf, tobacco leaf, fragments of tobacco ribs, reconstituted tobacco, homogenised tobacco, extruded tobacco and expanded tobacco.

The gel may comprise other flavours, for example menthol. Menthol can be added either in water or in the aerosol former prior to the formation of the gel.

In embodiments where agar is used as the gelling agent, the gel may comprise between 0.5 and 5 percent by weight, preferably between 0.8 and 1 percent by weight, agar. Preferably the gel further comprises between 0.1 and 2 percent by weight nicotine. Preferably, the gel further comprises between 30 percent and 90 percent by weight (or between 70 and 90 percent by weight) glycerine. In specific embodiments a remainder of the gel comprises water and flavourings.

Preferably the gelling agent is agar, which has the property of melting at temperatures above 85 degrees Celsius and turning back to gel at around 40 degrees Celsius. This property makes it suitable for hot environments. The gel will not melt at 50 degrees Celsius, which is useful if the system is left in a hot automobile in the sun, for example. A phase transition to liquid at around 85 degrees Celsius means that the gel only needs to be heated to a relatively low-temperature to induce aerosolization, allowing low energy consumption. It may be beneficial to use only agarose, which is one of the components of agar, instead of agar.

When Gellan gum is used as the gelling agent, typically the gel comprises between 0.5 and 5 percent by weight Gellan gum. Preferably the gel further comprises between 0.1 and 2 percent by weight nicotine. Preferably, the gel comprises between 30 percent and 99.4 percent by weight gylcerin. In specific embodiments a remainder of the gel comprises water and flavourings.

In one example, the gel comprises 2 percent by weight nicotine, 70 percent by weight glycerol, 27 percent by weight water and 1 percent by weight agar.

In another example, the gel comprises 65 percent by weight glycerol, 20 percent by weight water, 14.3 percent by weight tobacco and 0.7 percent by weight agar.

In particular, the quantity of gel per unitary article might be set or adjusted in relation to the nicotine expected delivery and/or the total expected aerosol quantity generation and/or the expected user experience duration.

As used herein, the term 'susceptor material' refers to a material that is capable to convert electromagnetic energy into heat. When located in an alternating electromagnetic field, typically eddy currents are induced and hysteresis losses may occur in the susceptor causing heating of the susceptor. As the susceptor material is located in thermal contact with the sensorial medium, the sensorial medium is heated by the susceptor material, releasing fluid from the susceptor material.

The susceptor material may be formed from any material that can be inductively heated to a temperature sufficient to release material from the sensorial medium. Preferred susceptor materials comprise metal or carbon. A preferred susceptor material may comprise or consist of a ferrous or ferromagnetic material, for example ferritic iron, a ferromagnetic alloy, such as ferromagnetic steel, stainless steel or aluminium. The susceptor material preferably comprises more than 5 percent, preferably more than 20 percent, preferably more than 50 percent or 90 percent of ferromagnetic or paramagnetic materials. Preferred susceptors may be heated to a temperature between about 150 degree Celsius and about 300 degree Celsius. Preferably, the susceptors may be heated to a temperature between about 200 degree Celsius and about 270 degree Celsius, for example 235 degree Celsius.

Preferably, a band of susceptor material is a metallic elongate material.

Preferably, a band of susceptor material is a stainless steel band. However, susceptor materials may also comprise or be made of graphite, molybdenum, silicon carbide, aluminum, niobium, Inconel alloys (austenite nickel-chromium-based superalloys), metallized films, ceramics such as for example zirconia, transition metals such as for example Iron, Cobalt, Nickel, or metalloids components such as for example Bor, Carbon, Silicium, Phosphor, Aluminium.

The susceptor material has the form of a band. Preferably, the band has a basic rectangular shape having a width preferably between about 2 millimeter and about 8 millimeter, more preferably, between about 3 millimeter and about 5 millimeter, for example 4 millimeter and a thickness preferably between about 0.03 millimeter and about 1 millimeter, more preferably between about 0.05 millimeter and about 0.5 millimeter, for example between about 0.07 millimeter and about 0.2 millimeter. The width of the band of susceptor material is smaller than a width or diameter of a plug the susceptor material is arranged in.

Below, there is provided a non-exhaustive list of non-limiting examples. Any one or more of the features of these examples may be combined with any one or more features of another example, embodiment, or aspect described herein.

Example A: Method for manufacturing a susceptor for an inductively heatable aerosol-generating article, wherein the method comprises the steps of:

- Providing a band of susceptor material,
- Providing a compression stage comprising oppositely arranged compression elements, wherein in a first portion of the compression stage, the compression elements are arranged to define a progressively narrowing compression gap in processing direction and wherein in a second portion of the compression stage the compression elements are arranged to define a constant compression gap there between in processing direction and wherein the oppositely arranged compression elements are configured to have matching surface structures
- Guiding the band of susceptor material through the narrowing compression gap of the compression stage, such that the matching surface structures of the compression elements deep draw the band of susceptor material.

Example B: Method according to example A, wherein the compression elements are belts that are guided over a plurality of guide rollers, wherein in a first portion of the compression stage the guide rollers are arranged such that the belts define a progressively narrowing compression gap in processing direction.

Example C: Method according to any one of the preceding examples, wherein the belts are provided with alternately arranged teeth, such that a tooth of one belt interpenetrates between two neighbouring teeth arranged on the opposite belt.

Example D: Method according to any one of the preceding examples, wherein the belts are provided with alternately arranged and matching protruding and recessing structures, wherein the protruding structures from the one belt interpenetrate the recessing structures of the other belt, thereby deep-drawing the band of susceptor material guided between the belts.

Example E: Method according to example A, wherein the compression elements are screw shaped elements that are configured and arranged such that the threadings provided at the outer circumference of the screw shaped elements form a progressively narrowing compression gap in processing direction.

Example F: Method according to example E, wherein the compression elements are screw shaped elements that are arranged such that their longitudinal axis are inclined towards each other such that the threadings provided at the outer circumference of the screw shaped elements form a progressively narrowing compression gap in processing direction.

Example G: Method according to example E, wherein the compression elements are screw shaped elements having a progressively increasing diameter and are arranged such that their longitudinal axis are in parallel to each other such that the threadings provided at the outer circumference of the screw shaped elements form a progressively narrowing compression gap in processing direction.

Example H: Method according to any one of examples E to G, wherein the compression stage comprises one or two screw shaped guiding elements that are arranged on top or below the narrowing compression gap and in engagement with the compression elements.

Example I: Method according to any one of the preceding examples, wherein the compression stage further comprises a third portion in which compression elements are arranged to define a progressively expanding gap in processing direction.

Example J: Method according to any one of the preceding examples, wherein the portion of the compression stage forming the progressively narrowing compression gap is located at the upstream end of the compression stage.

Example K: Method according to any one of the preceding examples, wherein the portion of the compression stage forming the progressively expanding gap is located at the downstream end of the compression stage.

Example L: Method according to any one of the preceding examples, wherein the method comprises a sensorial medium injection step, in which a sensorial medium is injected into a depression of the band of susceptor material formed during the compression step.

Example M: Method according to any one of the preceding examples, wherein a tooth or a protruding structure is provided with a central channel that is in fluid communication with a sensorial medium storage, and wherein the sensorial medium is provided to a depression of the band of susceptor material in the third portion of the compression stage defining the progressively expanding gap.

Example N: Method according to any one of the preceding examples, wherein a ridge of the screw shaped compression elements that are arranged to form the progressively expanding gap is configured with one or more central channels that are in fluid communication with a sensorial medium storage, and wherein the sensorial medium is provided to a depression of the band of susceptor material in the third portion of the compression stage defining the progressively expanding gap in processing direction.

Example O: Method for manufacturing a susceptor for an inductively heatable aerosol-generating article, wherein the method comprises the steps of:

- Providing a band of susceptor material,
- providing a cutting stage comprising a periodically corrugated blade for cutting and expanding at least parts of the band of susceptor material, such that the band of susceptor material is provided with successive portions of plain and expanded susceptor material.

Example P: Method according to example O, wherein the cutting process is a step-wise process, in which in between individual cutting steps, the band of susceptor material is fed forward by a predetermined amount and the periodically corrugated blade is reciprocated perpendicular to the feed direction.

Example Q: Method according to any one of examples O and P, wherein after the cutting process the band of susceptor material is flattened by folding or stamping such that a flat metal band with successively arranged plain and expanded portions of susceptor material is obtained.

Example R: Method according to any one of examples O to Q, wherein during the cutting and expanding process a sensorial medium is provided to the band of susceptor material, such that the expanded regions are simultaneously provided with sensorial medium.

Example S: Method according to any one of examples Q to R, wherein the flattened band of susceptor material is provided with a corrugation in such way that the plain portions are formed into troughs and that the expanded portions are formed into the crests of the resulting corrugated band.

Example T: Method according to any one of examples O to S, wherein two bands of susceptor material are superimposed such that the expanded portions of the one band of susceptor material are located adjacent the plain portions of the other band of susceptor material.

Example U: Method according to any one of examples Q to R, wherein the sensorial medium is provided to the band of susceptor material after the flattening step.

Example V: Method according to any one of the preceding examples, wherein the sensorial medium is provided as a gel in a tank, and the processed susceptor material is guided through the sensorial medium tank.

Example W: Method according to any one of the preceding examples, wherein the sensorial medium is provided as a gel in a tank, and the sensorial medium is deposited onto the processed susceptor material via a coating roller, wherein the coating roller is in fluid communication with sensorial medium in the tank.

Example X: Method according to any one of the preceding examples, wherein the sensorial medium is provided as a gel in a tank having a dispensing opening at its bottom side, and wherein the processed susceptor material with successively arranged plain and expanded regions is guided directly below and adjacent to the opening of the sensorial medium tank.

Example Y: Method according to any one of the preceding examples, wherein the sensorial medium storage is pressurized so that sensorial medium exhausted out of the sensorial medium storage fills the expanded regions.

Example Z: Method according to any one of the preceding examples, wherein the sensorial medium tank is periodically pressurized so that gel is exhausted out of the sensorial medium storage to fill the expanded portions only when an expanded portion runs adjacent to the opening of the sensorial medium storage.

Example ZA: Method according to any one of the preceding examples, wherein the sensorial medium is provided to the susceptor material via an injection device, wherein the sensorial medium is a gel and the sensorial medium is ejected from the applicator under pressure to the nearby passing band.

Example ZB: Method according to any one of the preceding examples, wherein the sensorial medium is ejected continuously or periodically.

Example ZC: Method according to any one the preceding examples, wherein the injection device comprises a pump, preferably a peristaltic pump, for delivering the sensorial medium.

Example ZD: Method according to any one of the preceding examples, wherein the band of susceptor material is provided as a corrugated band and in which the sensorial medium is provided as a gel strip in solid state, wherein the apparatus comprises a injection device comprising an advancement mechanism for the gel strip and a puncher for cutting off an amount of gel and for delivering this amount of gel to a trough of the corrugated band of susceptor material.

Example ZE: The method according to example ZD, in which the amount of gel material delivered to the trough is temporarily liquefied by a hot air gun.

Example ZF: The method according to examples ZD or ZE, wherein the corrugated band material is conveyed stepwise past the injection device via a toothed belt that is driven by a stepper motor.

Example ZG: The method according to any one of the preceding examples, wherein the troughs of either side of the corrugated band material are subsequently filled with sensorial medium.

Example ZH: Method according to any one of the preceding examples, wherein the band of susceptor material is provided as a corrugated band and in which the sensorial medium is provided as a liquid gel provided in a tank, wherein on side of the tank has an opening that is formed from two pre-biased or elastic lips and wherein the corrugated band is guided through the interior volume of the tank and exits the tank through the opening formed by the two pre-biased or elastic lips.

Example ZI: Method according to example ZH, wherein the length of the lips is such that the lips at any time press against at least two crests of the corrugated band.

Example ZJ: A susceptor for an inductively heatable aerosol-generating article, wherein the susceptor is provided as a band of susceptor material comprising successively arranged regions of plain and expanded susceptor material.

Example ZK: A susceptor in accordance with example ZJ, wherein the portions of expanded susceptor material are provided with sensorial medium.

Example ZL: A susceptor according to any one of examples ZJ or ZK, wherein the band of susceptor material is provided with a corrugation in such way that the plain portions are formed into troughs and that the expanded portions are formed into the crests of the resulting corrugated band.

Example ZM: A susceptor according to any one of examples ZJ to ZL, wherein the troughs formed in the portions of plain susceptor material are provided with sensorial medium.

Example ZN: A susceptor arrangement for an inductively heatable aerosol-generating article, wherein the susceptor arrangement comprises two susceptors according to any one of examples ZJ to ZM, and wherein the two susceptors are superimposed such that the expanded crest portions of the one susceptor are located adjacent the plain trough portions of the other susceptor.

Example ZO: A susceptor arrangement according to example ZN, wherein the susceptor arrangement is provided with sinusoidal or triangular corrugations, wherein the periodicity of the corrugation corresponds to the periodicity of the successive plain and expanded portions.

The invention will be further described, by way of example only, with reference to the accompanying drawings in which.

Figure 1:
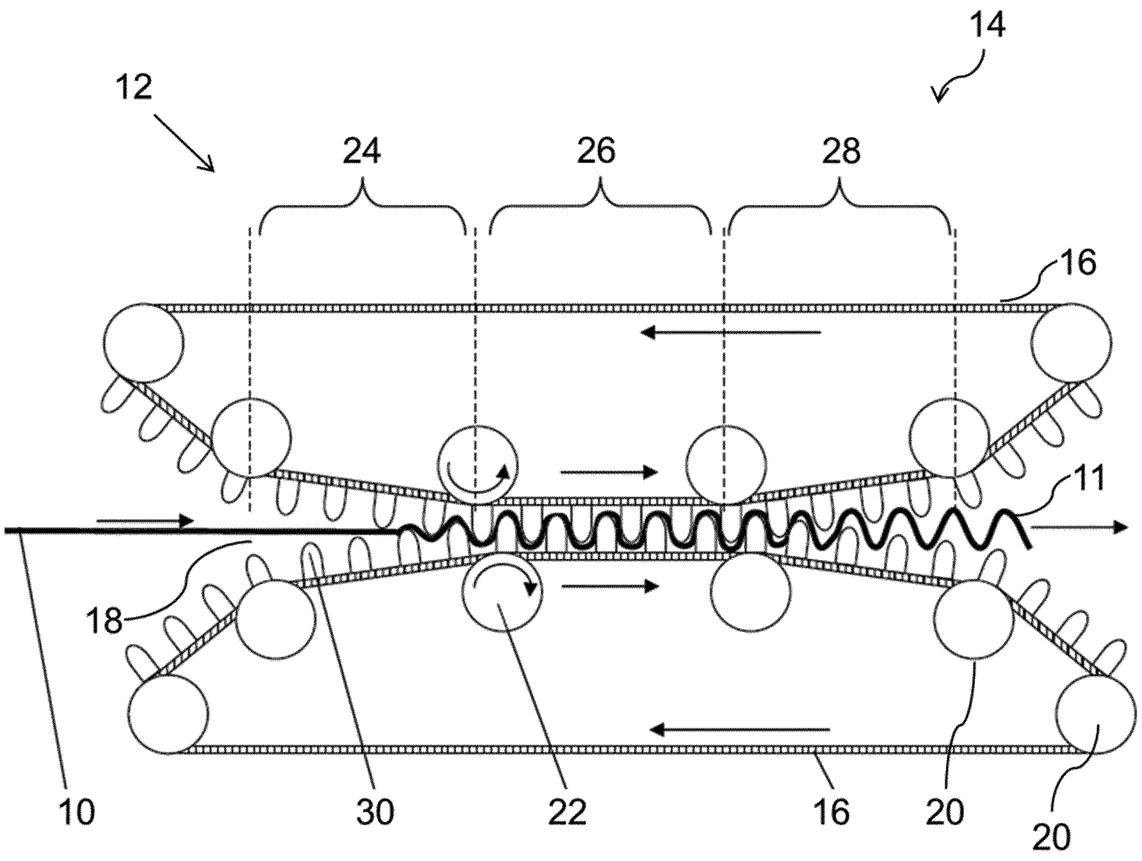
FIG. 1 shows a method of forming a corrugated band of susceptor material.

In FIG. 1 a first embodiment of a device for performing the method of the present invention is shown in which an initially flat band of susceptor material 10 is processed into a corrugated band of susceptor material 11. The flat band of susceptor material 10 is a stainless steel band having a width of about 5 millimeter and a thickness of about 0.05 millimeter.

The flat band of susceptor material 10 is fed into a processing device 12 having a compression stage 14 in which the band of susceptor material 10 is provided with a desired corrugation. For this purpose oppositely arranged compression elements 16 are provided that define a compression gap 18 there between.

The compression elements are toothed endless belts 16 that are each guided over guide rollers 20. One of the guide rollers 20 is configured as a drive roller 22 that is connected to a drive motor (not shown). The guide rollers 20 and the drive rollers 22 are arranged to define three different portions of the compression stage 14.

In a first portion 24 of the compression stage 14, the guide rollers 20, 22 are arranged such that the compression elements 16 define in processing direction a progressively narrowing compression gap 18". In a second portion 26 of the compression stage 14 the guide rollers 20, 22 are arranged such that the compression elements 16 define in processing direction a constant compression gap 18 there between. In a third portion 28 of the compression stage 14 the guide rollers 20 are arranged such that the compression elements 16 define in processing direction an extending compression gap 18.

The oppositely arranged toothed endless belts 16 are arranged such that such that a tooth 30 of the one endless belt interpenetrates between two neighbouring teeth 30 arranged on the opposite belt.

The initially flat band of susceptor material 10 is guided thorough the compression stage 14 whereby the band 10 is fed into the narrowing gap 18 of the first portion 24 of the compression stage 14.

The matching surface structures, that are the interpenetrating teeth 30 of the opposing compression elements 16, progressively engage with the band of susceptor material 10 and progressively deep draw the material into the predetermined corrugated shape. In the second portion 26 of the compression stage 14, the compression gap 18 is kept constant in processing direction. In this portion of the compression stage 14 the compression elements 16 are used to confirm the corrugated shape of the band of susceptor material 10.

At the downstream end of the compression stage 14, the compression elements 16 and in particular the teeth 30 of the endless belts 16 are progressively withdrawn from the corrugated band of susceptor material 11. With this progressive withdrawal any potential damage to the freshly shaped band of susceptor material 11 is prevented.

Figure 2:
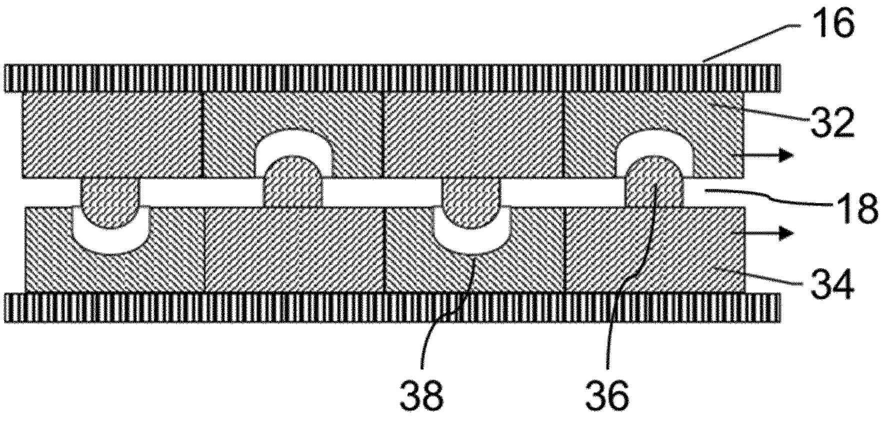
FIG. 2 shows an embodiment of a toothed belt.

In FIG. 2 an alternative arrangement for the toothed belt 16 having matching surface structures is depicted. The belts 16 are provided with alternately arranged matching female teeth 32 and male teeth 34. The male teeth 34 comprise a protrusion 36. The female teeth 32 are formed with a recess 38 that is large enough to receive the protrusion 36 of the male teeth 34 therein. In use a band of susceptor material 10 is guided between the toothed belts 16 with female teeth 32 and male teeth 34. The matching surface structures of these toothed belts 16 form alternately arranged depression in the band of susceptor material 10. In this way the initially flat band of susceptor material 10 is converted into a corrugated band of susceptor material 11.

Figure 3:
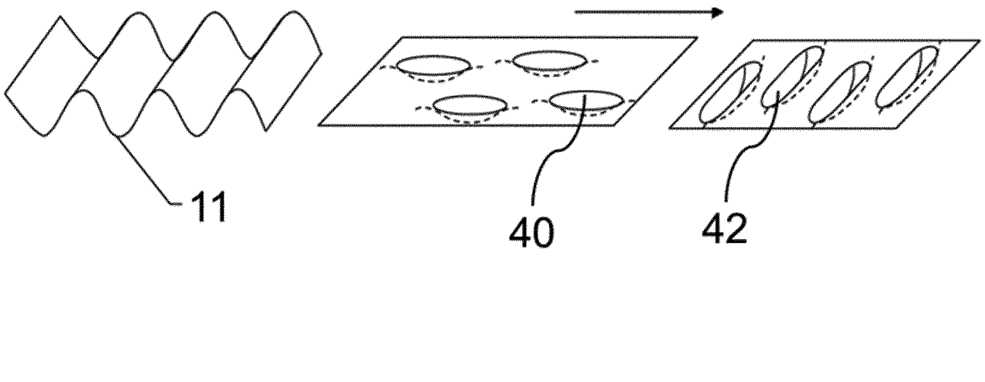
FIG. 3 shows bands of susceptor material with various surface patterns.

In FIG. 3 corrugated bands of susceptor material 11 with various surface patterns are depicted schematically. In the left view of FIG. 3 a corrugated band of susceptor material 11 having a regular, sinusoidal or wavy pattern is shown. However, also other patterns as depicted in the two other views of FIG. 3 are possible. The middle view of FIG. 3 shows a pattern in which a plurality of longitudinal depressions 40 are provided to the band of susceptor material 11. In the right view of FIG. 3 a plurality of transversal depressions 42 are provided to the band of susceptor material 11.

Figure 4:
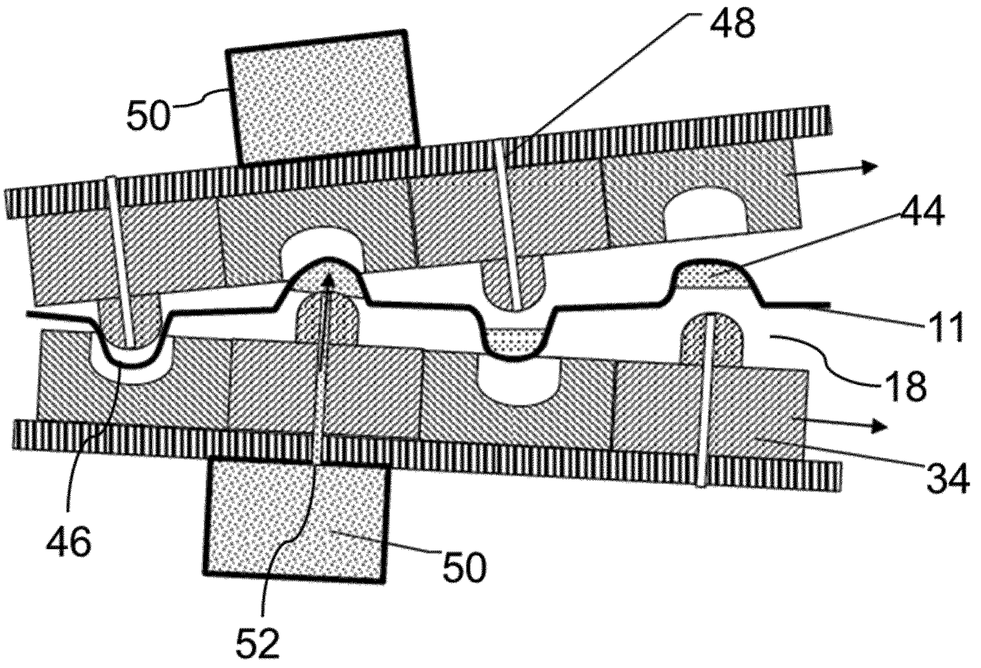
FIG. 4 shows an embodiment of a toothed belt including an injection device.

In FIG. 4 a configuration is depicted, in which the band of susceptor material 10 is provided with corrugations and wherein at the same time sensorial medium 44 is injected into each of the newly formed depressions 46. The toothed belts 16 depicted in FIG. 4 correspond to the belts 16 of FIG. 2.

The male teeth 34 are each provided with a central hollow channel 48 extending completely through the belt 16 and the male tooth 34. The toothed belts 16 are guided along a pressurized sensorial medium storage 50. Each of the sensorial medium storages 50 has an opening 52 that faces the back side of the respective toothed belt 16. The belts 16 are guided such that the back side of each of the toothed belts 16 generally covers the opening 52 of the respective pressurized sensorial medium storage 50. However, when a male tooth 34 with a central hollow channel 48 is guided past the opening 52 of the pressurized sensorial medium storage 50, the sensorial medium 50 can flow through the central hollow channel 48 and is delivered from the tip of the male tooth 34 into a depression 46 in the corrugated band of susceptor material 11.

The injection step is carried out in the third portion 28 of the compression stage 14. In this portion the belts 16 are arranged to form in processing direction an expanding compression gap 18, whereby the male teeth 34 are progressively withdrawn from the female teeth 32. As the protrusions 36 of the male teeth 34 are moved out of the depressions 46, they make room for the sensorial medium 44 to be injected.

The sensorial medium 44 is provided in gel form. The delivered amount of sensorial medium gel 44 is adjusted by modifying the pressure in the pressurized sensorial medium storage 50 and by modifying the speed of the belts 16. Pressurization of the sensorial medium storage 50 is obtained via a pump (not depicted).

Figure 5:
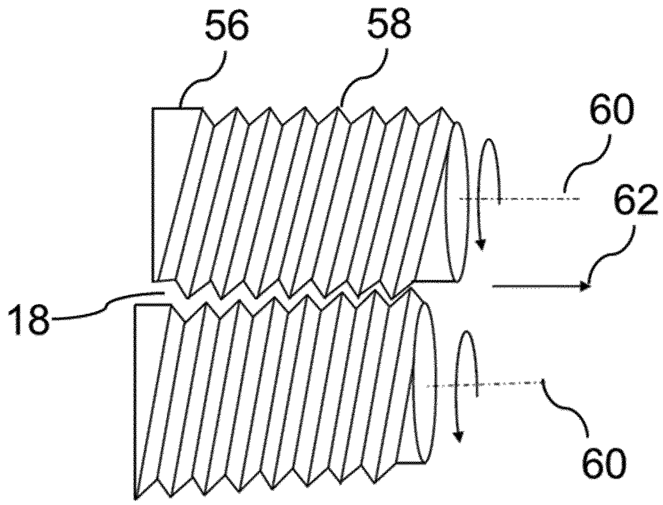
FIG. 5 shows a method of forming a corrugated band of susceptor material.
Figure 6:
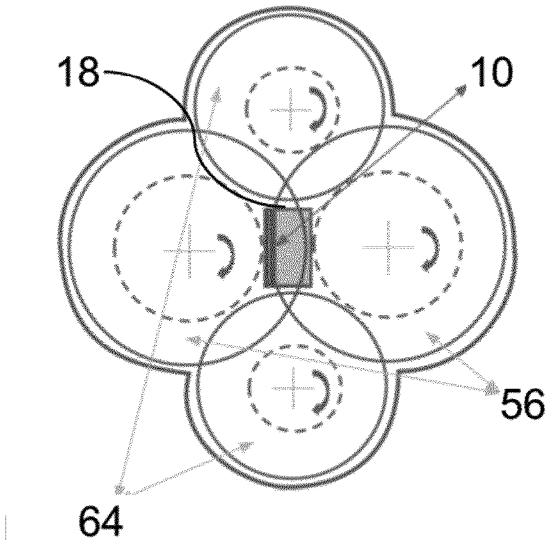
FIG. 6 is a cross-sectional view of the device of FIG. 5.
Figure 7:
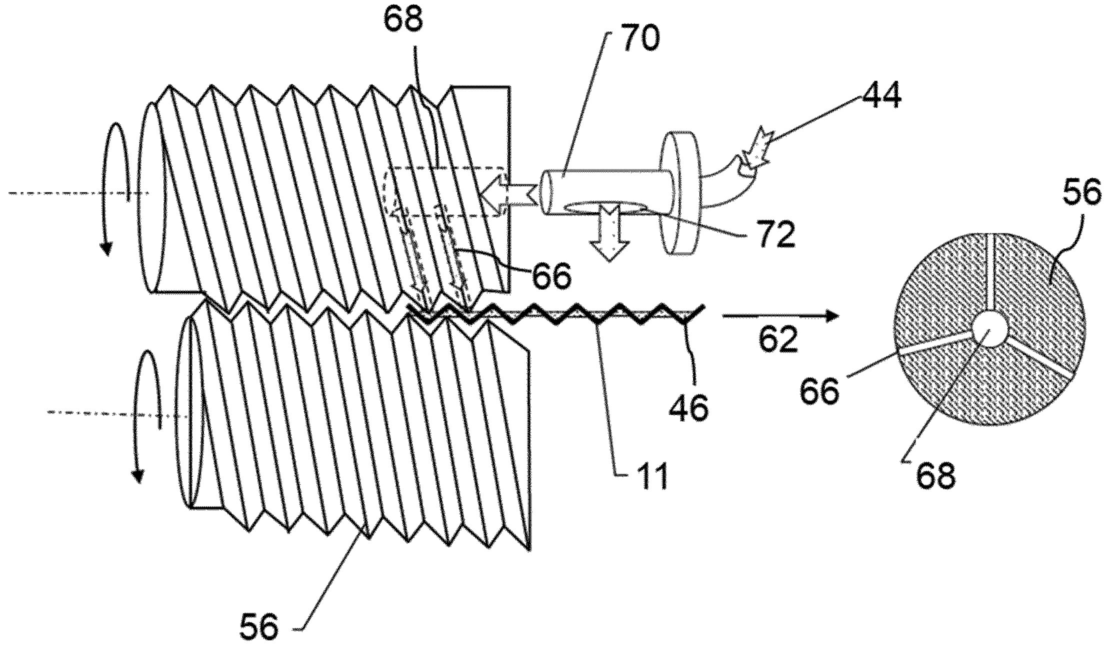
FIG. 7 illustrates a method of forming a corrugated band of susceptor material provided with sensorial medium.

FIGS. 5 to 7 relate to a further embodiment of the invention in which the method is carried out by employing compression elements in form of screw shaped elements 56. The screw shaped elements 56 are essentially cylindrical elements. The outer circumference of the oppositely arranged screw shaped elements 56 is provided with corresponding threadings 58 having a corresponding threading pitch.

As depicted in FIG. 5, the screw shaped elements 56 are arranged such that their longitudinal axes 60 are slightly inclined towards each other such that the threadings 58 provided at the outer circumference of the screw shaped elements 56 form in processing direction a progressively narrowing compression gap 18 with respect to the processing direction 62. In FIG. 5 only the first portion 24 of the compression stage 14 is depicted. In the first portion 24 of the compression stage 14 the initially flat band of susceptor material 10 is progressively drawn into a band having a corrugated shape 11. This first portion 24 is followed at least by a second portion 26 in which the screw shaped compression elements 56 are arranged to form in processing direction a constant compression gap 18.

In the embodiment of FIG. 6 the band of susceptor material 10 is additionally guided in the compression stage 14 by two guiding elements 64. The guiding elements 64 are also screw shaped elements. The screw shaped guiding elements 64 are arranged on top and below the pair of screw shaped compression elements 56. The screw shaped guiding elements 64 also have an outer threading having a thread pitch that corresponds to the thread pitch of the compression elements 56. In this way the guiding elements 64 rotatingly engage with the compression elements 56. The guiding elements 64 and the compression elements 64 laterally define the compression gap 18 through which the band of susceptor material 10 is guided.

FIG. 7 shows the third portion 28 of a compression stage 14 in which the compression elements 16 are provided in the form of opposing screw shaped elements 56. The screw shaped elements 56 are arranged such that they define in processing direction a progressively widening compression gap 18 in processing direction 62. The compression elements 56 are configured to deliver a sensorial medium gel 44 onto the band of susceptor material 11. For this purpose, the compression elements 56 comprise hollow radial channels 66 that open at the ridges of the threading provided at the outer circumference of one of the screw shaped compression elements 56. The hollow, radially arranged channels 66 extend into a central manifold channel 68 which in turn is connected to a stationary, pressurized sensorial medium storage (not shown). In FIG. 7 the central axial channel manifold 68 is configured to receive adapter 70 which is configured to be connected to the pressurized sensorial medium storage. Adapter 70 comprises a longitudinal opening 72 which enables fluid communication with the hollow, radially arranged channels 66. In FIG. 7 the sensorial medium injection device is only depicted with the upper compression element 56. However, a corresponding sensorial medium injection device is also provided to the lower compression element 56, such that sensorial medium 44 is provided to either side of the corrugated band if susceptor material 11.

At the right side of FIG. 7 a cross-sectional view of a compression element 56 comprising the fluid channels 66, 68 is depicted. In this case three equidistantly arranged radial channels 66 are provided per a thread turn. Each of the radial channels 66 extends from the central axial channel 68 to the outer circumference of the screw shaped compression element 56.

The quantity of sensorial medium 44 injected into a depression 46 is determined by the pressure in the sensorial medium storage, by the diameter of the axial hollow channel 68 as well as by the size and the number of the hollow radially arranged channels 66 in the screw shaped compression elements 56. The sensorial medium 44 may be injected continuously or intermittently. For this purpose a controllable valve (not shown) may be provided that can be opened and closed to control the sensorial medium flow onto the band of susceptor material 11.

FIGS. 8 to 11 relate to a method for manufacturing a susceptor for an inductively heatable aerosol-generating article. In this method an initially flat band of susceptor material is stepwise advanced to a cutting stage 80 comprising a periodically corrugated blade 82. The periodically corrugated blade 82 has periodical trapezoidal shape and is configured such that the flat band of susceptor material 10 is provided with partial cuts transverse to its longitudinal axis.

The corrugated blade 82 is at the same time also provided with a shaping portion 83 which follows the design of the cutting blade 82 and which stamps the cut portion into the corrugated shape defined by the corrugated blade 82. Thus, the cut portion of the initially flat band of susceptor material 10 is cut and expanded into this corrugated shape at the same time.

The cutting and expansion process is a step-wise process. The movement of the cutting blade 82 is a reciprocal movement as indicated with the series of arrows in FIG. 8. In the top view of FIG. 8 the band of susceptor material 10 is already advanced into the cutting stage 80 by a predetermined distance corresponding to the cut width of the cutting stage 80. As indicated by the arrow the corrugated blade 82 is moved to the right into a first cutting position.

Figure 8:
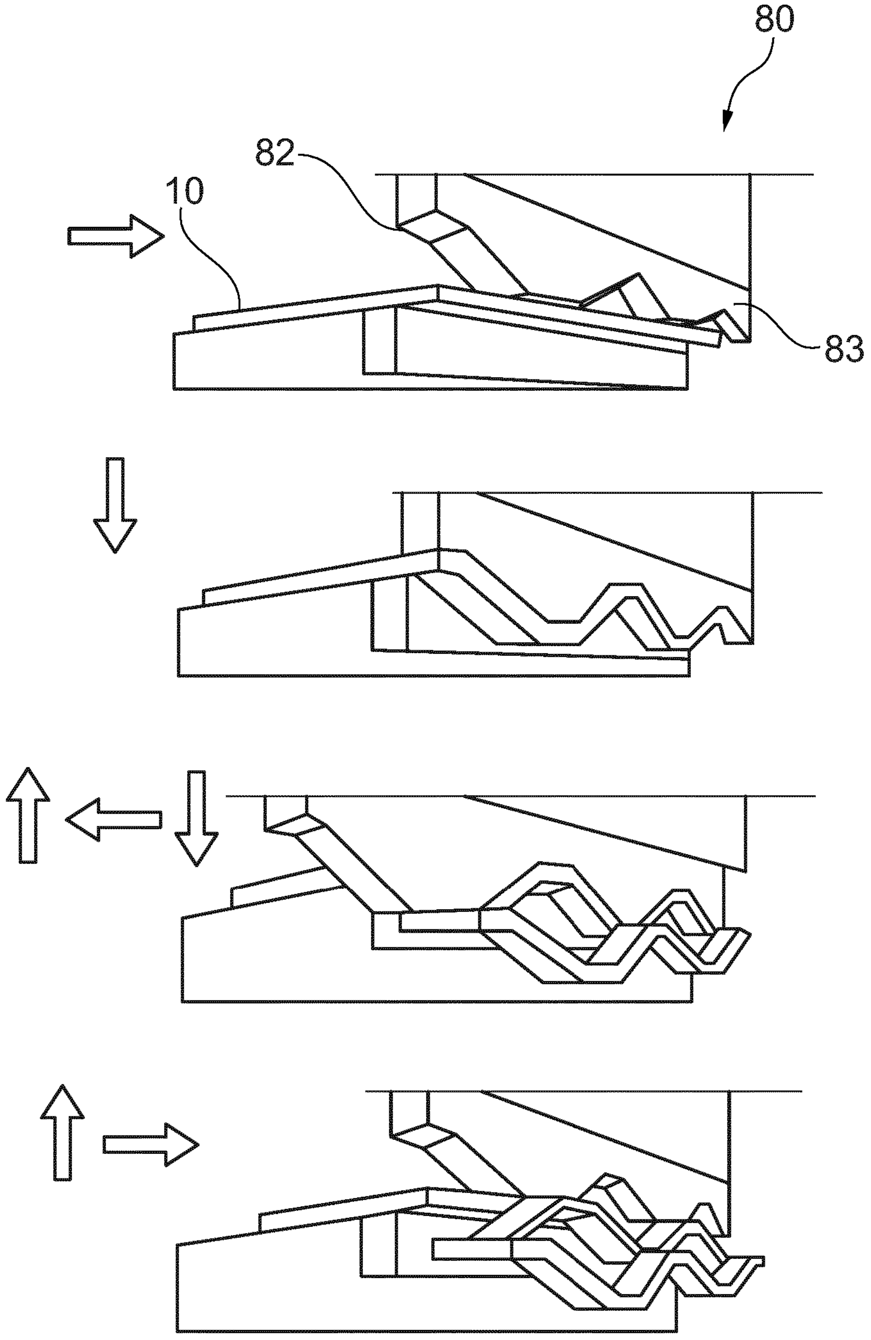
FIG. 8 illustrates a method of cutting and expanding a flat band of susceptor material.

In the second view of FIG. 8, the cutting blade 82 is in the first position and is moved downwards to simultaneously cut and expand the band of susceptor material 10. The cutting blade 82 is then moved upward and to the left by half a pitch of the blade corrugation into a second cutting position. The band of susceptor material 10 is again advanced by one step and the cutting blade 82 is moved downwards to perform a second cut that is laterally offset to the first cut. Similarly the expansion takes place laterally offset to the first expansion step. In the lowermost view of FIG. 8 the cutting blade 82 is lifted again and is moved backward into the first cutting position. The cutting process as described above may then be performed again. In this way the initially flat band of susceptor material 10 is provided with an expanded portion 86, which extends over at least a part of the length of the band of susceptor material 10.

Figure 9:
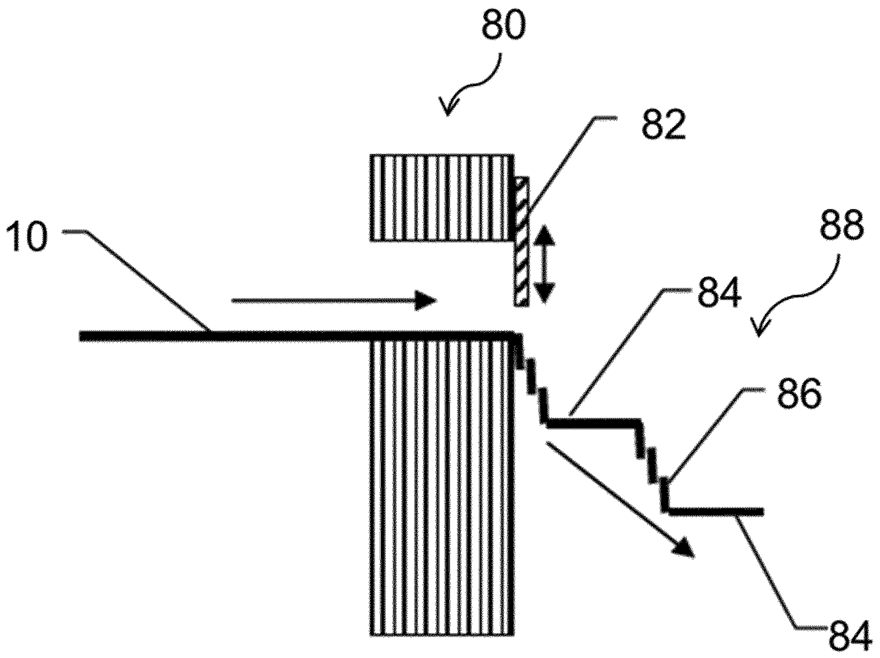
FIG. 9 shows a cutting and expanding stage.

By the expansion process the cut portion of the band of susceptor material 10 is expanded in cutting direction. The cutting direction essentially extends perpendicular to the plane defined by the flat band of susceptor material 10. In FIG. 9 the initially flat band of susceptor material 10 is provided with successive portions of plain or uncut susceptor material 84 and expanded or cut susceptor material 86. The resulting partially expanded band 88 therefore is provided with a stair-like profile in the length direction as depicted in the schematic view of FIG. 9.

Figure 10:
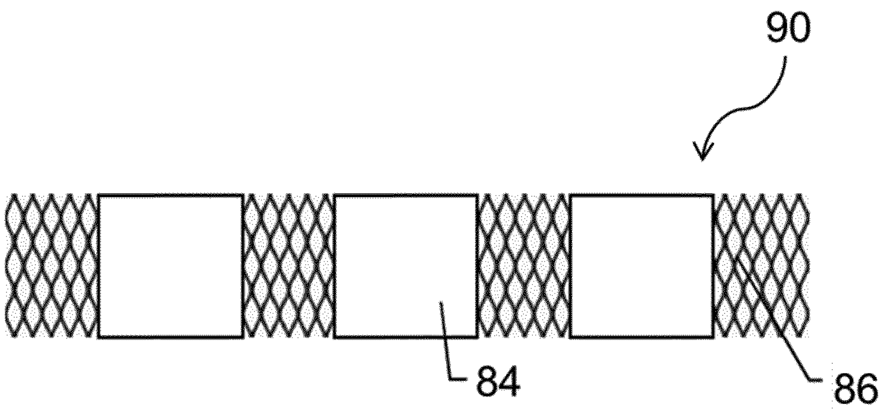
FIG. 10 shows a flat band of susceptor material having successive portions of plain and expanded susceptor material.

After cutting and expanding a band 88 with successive plain and expanded portions 84, 86 may be flattened to prepare the band of susceptor material 88 for further treatment. For this purpose the band of susceptor material 88 is flattened by a stamping device (not shown). The resulting flat band of susceptor material 90 with successively arranged plain and expanded portions 84, 86 is depicted in FIG. 10. As a result of the expansion process, the expanded portions are provided with through holes delimited by sheet straps or thongs. As an example, the straps or thongs width can be set to be equal to the thickness of the susceptor. Holes or perforations can present a maximum opening dimension greater or at least equal to the thickness of the susceptor.

Figure 11:
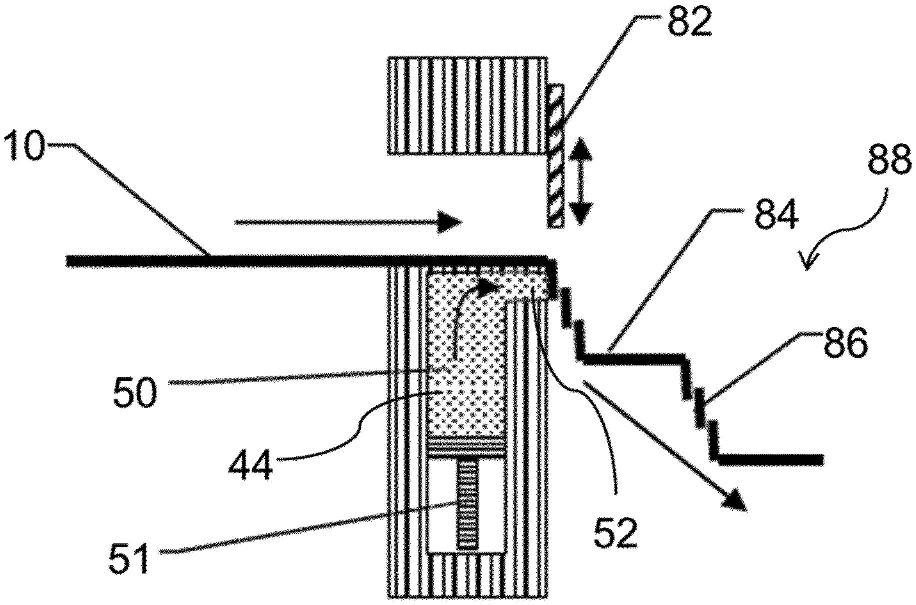
FIG. 11 illustrates a method of providing a band of susceptor material of FIG. 10 with sensorial medium.

As depicted in FIG. 11, the partially expanded band of susceptor material 88 is further provided with sensorial medium 44. The sensorial medium 44 is provided to the band of susceptor material 88 during the cutting and expansion process. For this purpose the cutting stage 80 is provided with a sensorial medium storage 50. The sensorial medium storage 50 has a release opening 52 that is directly adjacent to the cutting and expanding stage 80. During the cutting and expanding step the portion 86 of the band of susceptor material that is getting expanded by the cutting blade 82 is moved across the release opening 52.

The sensorial medium storage 50 is configured such that sensorial medium 44 is released during expansion of the band of susceptor material 10. For this purpose, the sensorial medium storage 50 comprises a controllable piston 51 that presses the sensorial medium 44 out of the release opening 52. The piston 51 is synchronized with the cutting blade 82, such that the sensorial medium 44 is released during the downward movement of the cutting blade 82 in the expansion step.

The interstices in the expanded portion of the band of susceptor material 86 are well suited to take up a sensorial medium 44. Moreover, the expanded portion 86 is open to either side of the band of susceptor material 88, such that the vaporized sensorial medium 44 can be readily taken up by an air flow past the susceptor element in use.

The flattened band of susceptor material 90 having successive plain and expanded portions 84, 86 may be formed into a corrugated band of susceptor material 11 as described with FIGS. 1 and 5 above. As depicted in the uppermost view of FIG. 12, the periodicity of the plain and expanded portions 84, 86 may correspond to the periodicity of the corrugation that is provided to the band of susceptor material 11. In this way a corrugated band of susceptor material 11 is obtained wherein the corrugations, in other words the successive troughs and crests, are formed from plain portions 84 and from expanded portions 86, whereby the expanded portions 86 are provided with sensorial medium 44.

Figure 12:
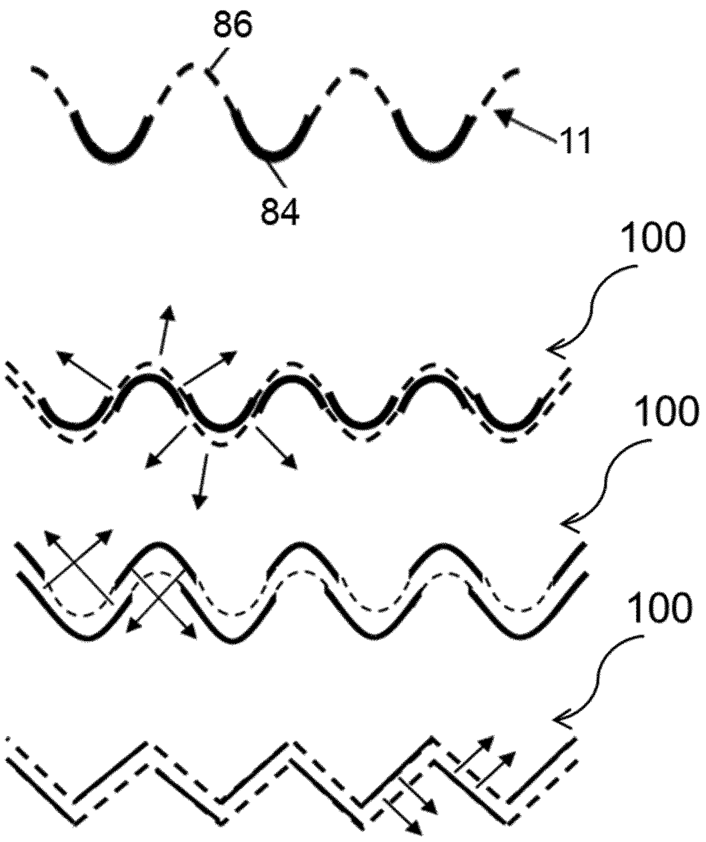
FIG. 12 shows a corrugated band of susceptor material having successive portions of plain and expanded susceptor material and corresponding susceptor arrangements.

As depicted in the further views of FIG. 12, two bands of susceptor material 90 may be superimposed to form a susceptor arrangement 100. FIG. 12 shows three alternative arrangements of how two corrugated bands of susceptor material 90 may be superimposed. The arrows in these views indicate the main diffusion direction of the sensorial medium 44 upon vaporization.

The two bands of susceptor material 90 may be arranged such that on either side the crests of the susceptor arrangement 100 are formed from the expanded portions 86 of the corrugated band of susceptor material 90. In use of such susceptor arrangement 100 in an aerosol-generating device, this arrangement allows the vaporized material to easily enter into the airflow path that is directed along the susceptor arrangement 100.

Alternatively the two corrugated bands of susceptor material 90 may also be arranged such that on either side the crests of the susceptor arrangement 100 are formed from the plain portions 84 of the corrugated bands of susceptor material 90. Crests formed from the plain portions 84 may protect the loaded expanded portions 86 from friction with additional material provided in the aerosol-generating system in the vicinity to the susceptor arrangement 100.

In the lower most view of FIG. 12 the corrugated bands of susceptor material 90 are provided with triangular corrugations. The corrugated bands of susceptor material 90 are arranged such that the diffusion direction of the vaporized sensorial medium is orientated. In FIG. 12 the susceptors are arranged such that the diffusion direction points towards the right side. This direction may correspond to the air flow direction through an aerosol-generating article in use.

The sensorial medium 44 may also be supplied to a flat or corrugated band of susceptor material 90, 11 in a subsequent, separate method step.

Figure 13:
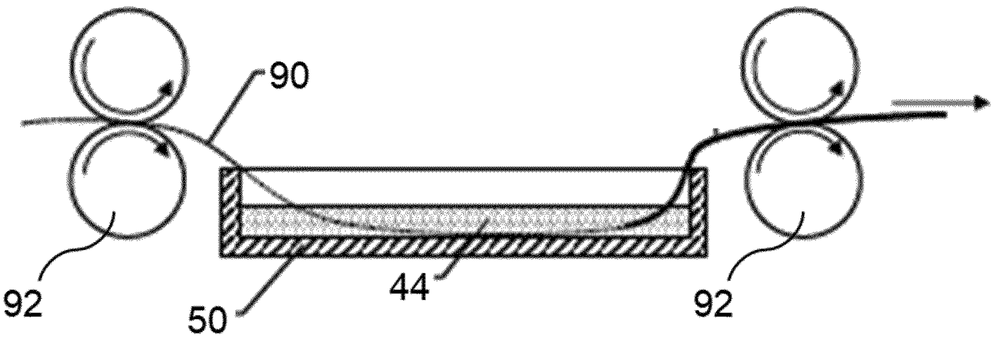
FIG. 13 shows a device for providing sensorial medium to a susceptor of FIG. 10.

In FIG. 13 a band of susceptor material 90 as shown in FIG. 10 is provided with sensorial medium 44 after the band of susceptor material 90 has been partially expanded and flattened. The band of susceptor material 90 is guided through a sensorial medium storage 50 comprising sensorial medium 44 in gel form. The band of susceptor material 90 is fully immersed into the sensorial medium gel 44.

In order to carry the band of susceptor 90 material through the sensorial medium storage 52, a pair of guide rollers 92 is provided upstream and downstream from the sensorial medium storage 50. In this way the movement of the band of susceptor material 90 through the sensorial medium storage 50 is well controlled.

The sensorial medium gel 44 sticks better to the expanded portions 86 than to the plain portions 84 of the band of susceptor material 90. Accordingly, this method is particularly suited for selectively depositing sensorial medium 44 onto expanded portions 86 of a band of susceptor material 90.

Figure 14:
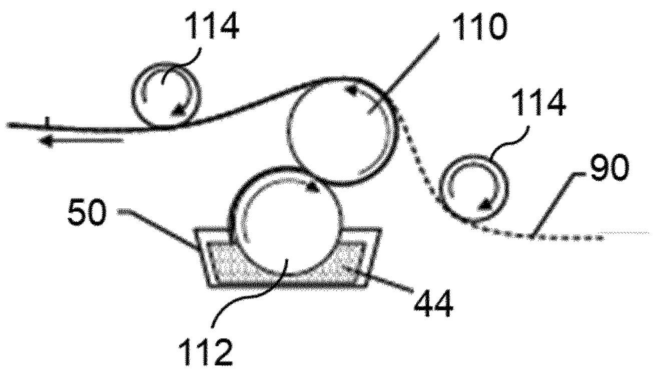
FIG. 14 shows a device for providing sensorial medium to a susceptor of FIG. 10.
Figure 15:
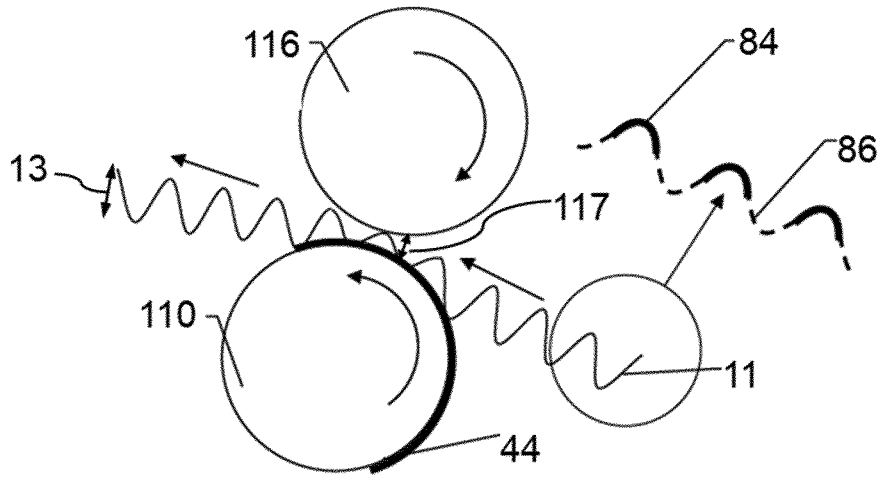
FIG. 15 shows a device for providing sensorial medium to a corrugated susceptor.

As depicted in FIGS. 14 and 15 the sensorial medium may also be provided to a band of susceptor material 90 via a coating roller 110.

FIG. 14 schematically shows a method for providing sensorial medium 44 to a flat band of susceptor material 90. The band of susceptor material 90 is again configured as described in connection with FIG. 10. The band of susceptor material 90 is guided over a coating roller 110. The coating roller 110 is in communication with a sensorial medium storage 50. By guiding the band of susceptor material 90 over the coating roller 110 the sensorial medium 44 is deposited onto the band of susceptor material 90.

In FIG. 14 the coating roller 110 is in rolling contact with an intermediate roller 112, which in turn dips into the sensorial medium storage 50 comprising a sensorial medium 44 in gel form. The rotating intermediate roller 112 continuously takes up gel 44 onto its surface and supplies this gel 44 to the surface of the coating roller 110. From the coating roller 110 the gel 44 is provided to the band of susceptor material 90.

Since the gel 44 does stick well to the expanded portions 86 of the band of susceptor material 90, it is mainly these portions that take up the sensorial medium gel 44. Gel that does not adhere to the band of susceptor material 90 remains at the coating roller 110 and is re-supplied to the band of susceptor material 90 upon the next revolution of the coating roller 110.

The band of susceptor material 90 is slightly pressed against the coating roller 110 such that a sufficient contact force between the band of susceptor material 90 and the coating roller 110 is maintained. In FIG. 14 the band of susceptor material 90 is pressed against the coating roller 110 by two tension rollers 114 that are provided downstream and upstream of the coating roller 110. The tension rollers 114 are arranged such that the tension of the band of susceptor material 90 in the vicinity of the coating roller 110 is maintained at a predetermined value. With the tension rollers 114 the band tension as well as the arc of contact between the band of susceptor material 90 and the coating roller 110 is adjusted.

FIG. 15 shows a similar method that may primarily be used for coating a corrugated band of susceptor material 11. The corrugated band 11 is guided through a roller gap 117 formed between the coating roller 110 and a counter roller 116. The size of this roller gap 117 is somewhat smaller than the peak-to-peak distance 13 of the corrugations of the corrugated band of susceptor material 11. In this way the counter roller 116 presses the band of susceptor material 11 against the coating roller 110. Thereby a sufficient contact pressure is maintained and at the same time the contact surface between the corrugated band of susceptor material 11 and the coating roller 110 is enlarged. In FIG. 15 the band of susceptor material 11 is configured as having a wavy shape. However, corrugated bands 11 having a differently shaped corrugated profile might be used.

The coating roller 110 contacts only the crests of the band of susceptor material. Accordingly, only the crests of the corrugated band are provided with sensorial medium 44. This method may therefore be particularly suitable to be used with corrugated bands of susceptor material which comprise plain portions 84 and expanded portions 86 and in which the crests are formed in the expanded portions of susceptor material 86, as depicted in FIG. 15.

Figure 16:
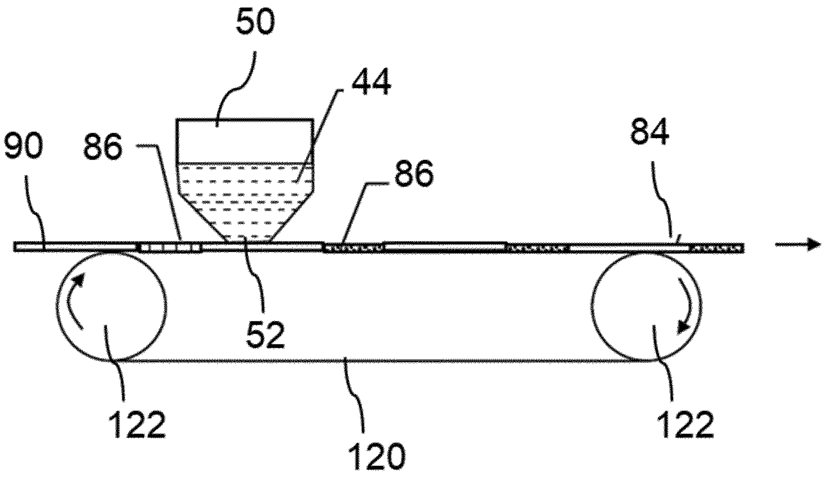
FIG. 16 shows a device for providing sensorial medium to a susceptor of FIG. 10.
Figure 17:
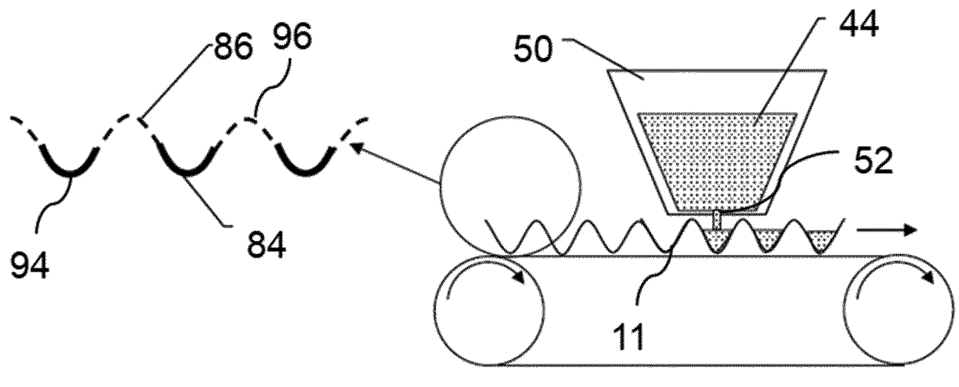
FIG. 17 shows a device for providing sensorial medium to a corrugated susceptor.

As depicted in FIGS. 16 and 17, the sensorial medium 44 may be provided to the band of susceptor material 11, 90 by guiding the band of susceptor material 11, 90 below a sensorial medium storage 50. The sensorial medium storage has a release opening 52 at its bottom.

In FIG. 16 a sensorial medium is provided to a flat band of susceptor material 90 comprising successive portions of plain and expanded susceptor material 84, 86 as described in connection with FIG. 10. The band 90 is conveyed on an endless moving belt 120 that is guided over guide wheels 122. The release opening 52 of the sensorial medium storage 50 is located directly above and in contact with the upper surface of the band of susceptor material 90.

When a plain portion 84 of the band of susceptor material 90 is directly beneath the release opening 52, the plain portion 84 effectively seals the release opening 52 and prevents outflow of sensorial medium 44 onto the band of susceptor material 90.

When an expanded portion 86 of the band of susceptor material 90 is directly beneath the release opening 92, sensorial medium 44 is delivered onto these expanded portions 86. In this way only a limited quantity of sensorial medium 44 is delivered selectively to the band of susceptor material 90. Sensorial medium 44 is located in the open area of the expanded portion 86 so that the general thickness is not increased after loading the sensorial medium. In this way, the further handling of the material is facilitated.

In FIG. 17 a similar injection device as in FIG. 16 is used for delivering sensorial medium 44 to a corrugated band of susceptor material 11. In this configuration, the release opening 52 at the bottom of the sensorial medium storage 50 is not necessarily in contact with the band of susceptor material 11.

This injection device is particularly useful for deposition of sensorial medium 44 onto a corrugated band of susceptor material 11 in which the troughs 94 are formed from plain portions of susceptor material 84. The troughs 94 may hold a significant amount of sensorial medium 44.

In FIG. 17 the crests 96 of the band of susceptor material 11 are formed from expanded portions 86. These crests 96 act as spill-over to limit the amount of sensorial medium 44 delivered to the troughs 94. Thus, when the fill level in the troughs 94 reaches the crests 96 formed from the porous expanded material portions 86, any exceeding amount of sensorial medium 44 spills out through the porous expanded material 86.

In order to limit the amount of sensorial medium 44 delivered to the corrugated band 11, the release opening 52 of the sensorial medium storage 50 is provided with an electronically controlled valve (not shown). Opening of the valve is controlled in dependence of the periodicity of the band of susceptor material 11 to be loaded with sensorial medium 44. In this way the sensorial medium 44 is delivered exactly when a trough 94 is located below the release opening 52.

Figure 18:
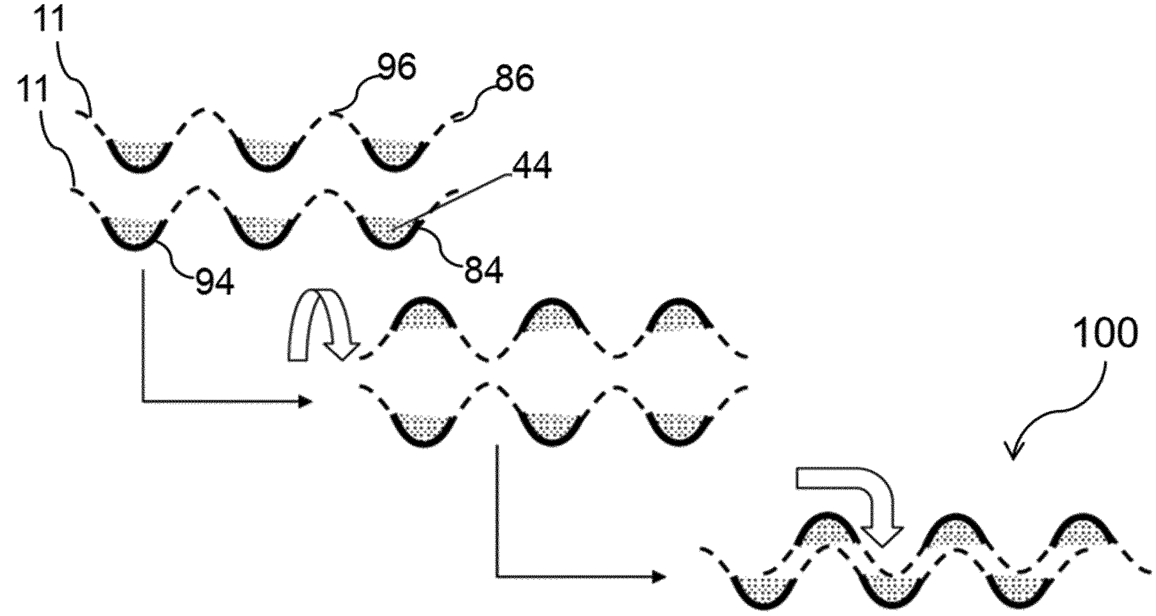
FIG. 18 shows a method for forming a susceptor arrangement.

Bands of susceptor material 11 provided with sensorial medium 44 by the method as depicted in FIG. 17 may be sandwiched to obtain a susceptor arrangement 100. A suitable assembly process for this purpose is depicted in FIG. 18.

In a first step two identical corrugated bands 11 are prepared, in which the crests 96 are formed from expanded portions of susceptor material 86, and in which the troughs 94 are formed from plain portions of susceptor material 84 and are filled with sensorial medium 44.

One of the bands 11 is turned upside down and is moved half a pitch to one side. The bands 11 are then superimposed on each other such that the expanded portions 86 of the one band 11 extend into the troughs 94 of the respective other band 11. As can be seen in the lowermost view of FIG. 18, the expanded portions 86 of the one band 11 cover the sensorial medium 44 provided to the troughs 94 of the other band 11. At the same the porous expanded portions 86 allow passage of the vaporized sensorial medium 44. The sensorial medium 44 helps to stick the two corrugated bands of susceptor material 11 together. With the process illustrated with FIG. 18 a very robust susceptor arrangement 100 is obtained.

Figure 19:
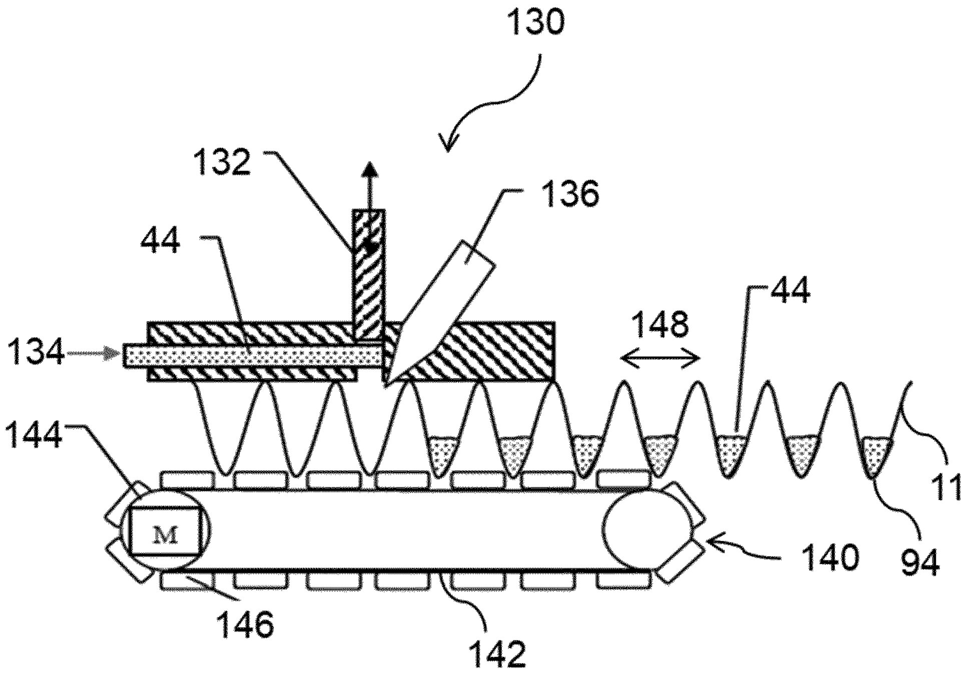
FIG. 19 illustrates a method of injecting solid state sensorial medium to a corrugated susceptor.

The sensorial medium 44 may be provided to a corrugated band of susceptor material 11 via an injection device 130 that utilizes sensorial medium 44 in solid state. A corresponding method is schematically depicted in FIG. 19. A solid state sensorial medium 44 is advanced towards a puncher 132 as indicated by the arrow 134. The puncher 132 is a movable element that is configured for cutting off an amount of sensorial medium 44 and delivering this amount of sensorial medium 44 to a trough 94 of the corrugated band of susceptor material 11. The advancement mechanism is not further depicted in FIG. 19, but any suitable advancement mechanisms known to the skilled person may be employed.

The corrugated band of susceptor material 11 is conveyed stepwise past the injection device 130. Stepwise movement of the corrugated band of susceptor material 11 is established via a conveyor device 140 comprising a toothed, endless belt 142 that is driven by a stepper motor 144. The teeth 146 of the toothed belt 142 are provided with a periodicity that corresponds to the periodicity of the corrugated band of susceptor material 11. In this way each tooth 146 of the toothed belt 142 engages with a trough 94 of the corrugated band of susceptor material 11, such that the toothed belt 142 conveys the corrugated band of susceptor material 11.

Each step of the stepper motor 144 and of the toothed belt 142 respectively, corresponds to the pitch width 148 of the corrugated band of susceptor material 11, such that each of the troughs 94 of the corrugated band 11 is consecutively placed under the injection device 130. After each step the puncher 132 is activated, cutting off a predetermined amount of the sensorial medium 44 and delivering this predetermined amount to a trough 94 of the corrugated band of susceptor material 11.

The method furthers comprises a step of temporarily liquefying the amount of sensorial medium 44 that is delivered to the troughs 94 of the corrugated band of susceptor material 11. For this purpose a hot air gun 136 is provided which is directed to the cut-off sensorial medium 44 in a trough 94. The hot air decreases the viscosity of the sensorial medium 44. The heated sensorial medium 44 becomes fluid and adheres to the walls of the troughs 94 of the band of susceptor material 11.

Figure 20:
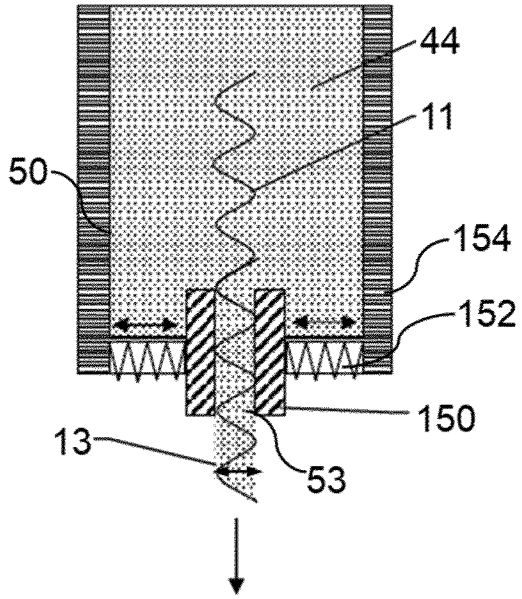
FIG. 20 illustrates a method of injecting liquid sensorial medium to a corrugated susceptor.
Figure 21:
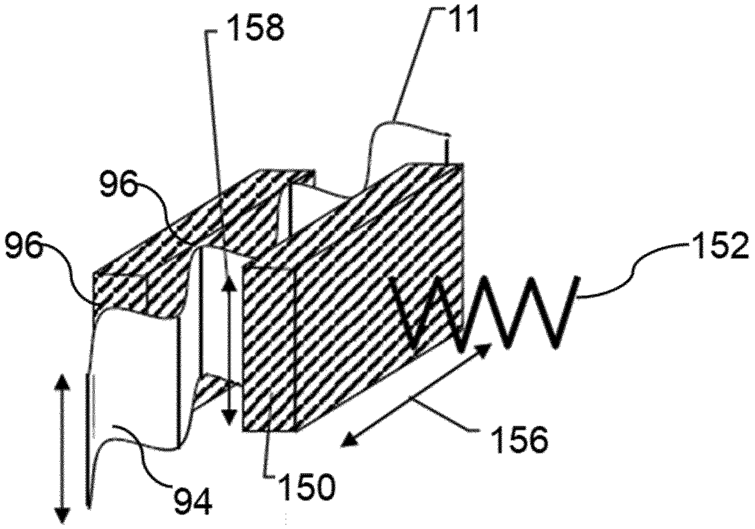
FIG. 21 is a detailed view of the outlet end of the sensorial medium storage of FIG. 20.

FIGS. 20 and 21 relate to a method for providing liquid sensorial medium 44 to a corrugated band of susceptor material 11. The liquid sensorial medium 44 is provided in a sensorial medium storage 50 through which the corrugated band of susceptor material 11 is guided. The sensorial medium storage 50 has an inlet opening (not shown) for introducing an unloaded corrugated band of susceptor material 11 into the sensorial medium storage 50. The sensorial medium storage 50 further has an outlet opening 53 for allowing the loaded corrugated band of susceptor material 11 to exit from the sensorial medium storage 50.

The outlet opening 53 is formed from two pre-biased lips 150 defining a distance there between that corresponds to the peak-to-peak distance 13 of the corrugated band of susceptor material 11.

The corrugated band 11 is guided through the interior volume of the sensorial medium storage 50 and is guided to exit the sensorial medium storage 50 through the outlet opening 53.

The two lips 150 defining the outlet opening 53 are formed from an elastic material and are pre-biased such that each of the lips 150 is slightly pressed against the corrugated band of susceptor material 11. Pre-biasing is obtained by a spring mechanism 152 that is provided between each of the lips 150 and the corresponding side surface 154 of the sensorial medium storage 50.

With the elastic material of the lips 150 and the spring mechanism 152, the lips 150 are tightly pressed from each side against the corrugated band of susceptor material 11. In this way height differences between subsequent crests of the corrugated band 11 are compensated.

Since the lips 150 press from each side against the corrugated band 11, the lips 150 effectively close the outlet opening 53 such that outflow of excess sensorial medium 44 from the sensorial medium storage 50 is largely avoided. In order to obtain reliable sealing the lips 150 are configured to have a length 156 such that at every moment each of the lips 150 contacts at least two crests of the respective side of the corrugated band of susceptor material 11.

The width 158 of the lips corresponds to the width of the corrugated band 11. The outlet opening 53 of the sensorial medium storage 50 is provided with a suitable sealing element (not shown) to seal the outlet opening 53 at the lateral sides of the corrugated band 11.

Upon guiding the corrugated band of susceptor material 11 through the interior and the outlet opening 53 of the liquid medium storage 50, liquid sensorial medium 44 is received in each trough 94 of the corrugated band of susceptor material 11. The sensorial medium 44 is configured to have a composition such that the sensorial medium 44 received in each trough 94 essentially adheres to the wall of the troughs 94 of the corrugated band 11 after the corrugated band 11 has left the sensorial medium storage 50 through the outlet opening 53.

The invention claimed is:

1. Method for manufacturing a susceptor for an inductively heatable aerosol-generating article, wherein the method comprises the steps of:

providing a band of susceptor material, providing a compression stage comprising oppositely arranged compression elements, wherein in a first portion of the compression stage, the compression elements are arranged to define a progressively narrowing compression gap in processing direction and wherein in a second portion of the compression stage the compression elements are arranged to define a constant compression gap there between in processing direction and wherein the oppositely arranged compression elements are configured to have matching surface structures, and guiding the band of susceptor material through the narrowing compression gap of the compression stage, such that the matching surface structures of the compression elements deep draw the band of susceptor material.

2. Method according to claim 1, wherein the compression elements are belts that are guided over a plurality of guide rollers, wherein in a first portion of the compression stage the guide rollers are arranged such that the belts define a progressively narrowing compression gap in processing direction.

3. Method according to claim 2, wherein the belts are provided with alternately arranged teeth, such that a tooth of one belt interpenetrates between two neighbouring teeth arranged on the opposite belt.

4. Method according to claim 1, wherein the compression elements are screw shaped elements that are configured and arranged such that the threadings provided at the outer circumference of the screw shaped elements form a progressively narrowing compression gap in processing direction.

5. Method according to claim 1, wherein the compression stage further comprises a third portion in which compression elements are arranged to define a progressively expanding gap in processing direction.

6. Method according to claim 1, wherein the method comprises a sensorial medium injection step, in which a sensorial medium is injected into a depression of the band of susceptor material formed during the compression step.

7. Method according to claim 1, wherein a tooth or a protruding structure is provided with a central channel that is in fluid communication with a sensorial medium storage, and wherein the sensorial medium is provided to a depression of the band of susceptor material in the third portion of the compression stage defining the progressively expanding gap in processing direction.

8. Method for manufacturing a susceptor for an inductively heatable aerosol-generating article, wherein the method comprises the steps of:

providing a band of susceptor material, and providing a cutting stage comprising a periodically corrugated blade for cutting and expanding at least parts of the band of susceptor material, such that the band of susceptor material is provided with successive portions of plain and expanded susceptor material.

9. Method according to claim 8, wherein the cutting process is a step-wise process, in which in between individual cutting steps, the band of susceptor material is fed forward by a predetermined amount and the periodically corrugated blade is reciprocated perpendicular to the feed direction.

10. Method according to claim 8, wherein during the cutting and expanding process a sensorial medium is provided to the band of susceptor material, such that the expanded regions are simultaneously provided with sensorial medium.

11. Method according to claim 8, wherein two bands of susceptor material are superimposed such that the expanded portions of the one band of susceptor material are located adjacent the plain portions of the other band of susceptor material.

12. A susceptor for an inductively heatable aerosol-generating article, wherein the susceptor is provided as a band of susceptor material comprising successively arranged regions of plain and expanded susceptor material, and wherein the expanded susceptor material comprises a plurality of openings.

13. A susceptor in accordance with claim 12, wherein the portions of expanded susceptor material are provided with sensorial medium.

14. A susceptor according to claim 12, wherein the band of susceptor material is provided with a corrugation in such way that the plain portions are formed into troughs and that the expanded portions are formed into the crests of the resulting corrugated band.

15. A susceptor arrangement for an inductively heatable aerosol-generating article, wherein the susceptor arrangement comprises two susceptors according to claim 12, and wherein the two susceptors are superimposed such that the expanded crest portions of the one susceptor are located adjacent the plain trough portions of the other susceptor.

* * * * *